United States Patent
Song et al.

(10) Patent No.: US 11,889,418 B2
(45) Date of Patent: Jan. 30, 2024

(54) METHOD AND DEVICE FOR RECEIVING WUR DISCOVERY FRAME IN WIRELESS LAN SYSTEM

(71) Applicant: LG Electronics Inc., Seoul (KR)

(72) Inventors: Taewon Song, Seoul (KR); Suhwook Kim, Seoul (KR); Jeongki Kim, Seoul (KR); Kiseon Ryu, Seoul (KR); Jinsoo Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 496 days.

(21) Appl. No.: 16/629,028

(22) PCT Filed: May 2, 2019

(86) PCT No.: PCT/KR2019/005254
§ 371 (c)(1),
(2) Date: Jan. 6, 2020

(87) PCT Pub. No.: WO2019/245158
PCT Pub. Date: Dec. 26, 2019

(65) Prior Publication Data
US 2022/0346009 A1 Oct. 27, 2022

(30) Foreign Application Priority Data

Jun. 22, 2018 (KR) .................. 10-2018-0072394
Jun. 26, 2018 (KR) .................. 10-2018-0073215

(51) Int. Cl.
*G08C 17/00* (2006.01)
*H04W 52/02* (2009.01)
(Continued)

(52) U.S. Cl.
CPC ....... *H04W 52/0229* (2013.01); *H04W 48/16* (2013.01); *H04W 84/12* (2013.01)

(58) Field of Classification Search
CPC ............ H04W 52/0029; H04W 52/02; H04W 52/0216; H04W 48/16; H04W 84/12; H04W 84/18
(Continued)

(56) References Cited

U.S. PATENT DOCUMENTS

2015/0181507 A1 6/2015 Park et al.
2015/0208330 A1 7/2015 Park et al.
(Continued)

FOREIGN PATENT DOCUMENTS

CN 104956735 9/2015
CN 106102127 11/2016
(Continued)

OTHER PUBLICATIONS

Extended European Search Report in European Application No. 19822416.4, dated Jul. 14, 2020, 7 pages.
(Continued)

*Primary Examiner* — Temica M Beamer
(74) *Attorney, Agent, or Firm* — Fish & Richardson P.C.

(57) ABSTRACT

Proposed herein is a method and device for receiving a WUR discovery frame in a wireless LAN system. More specifically, a station (STA) receives a WUR discovery element from an access point (AP). The STA receives the WUR discovery frame from a neighbor AP based on the WUR discovery element. The WUR discovery element includes AP list information. The AP list information includes information on a WUR discovery period. The WUR discovery frame is received during the WUR discovery period.

9 Claims, 36 Drawing Sheets

(51) Int. Cl.
*H04W 48/16* (2009.01)
*H04W 84/12* (2009.01)

(58) Field of Classification Search
USPC .......................................................... 370/311
See application file for complete search history.

(56) References Cited

U.S. PATENT DOCUMENTS

| | | | |
|---|---|---|---|
| 2015/0230093 A1 | 8/2015 | Park et al. | |
| 2015/0230161 A1 | 8/2015 | Park et al. | |
| 2018/0092029 A1* | 3/2018 | Canpolat | H04W 24/02 |
| 2018/0103430 A1* | 4/2018 | He | H04W 48/16 |
| 2018/0139695 A1 | 5/2018 | Gupta et al. | |

FOREIGN PATENT DOCUMENTS

| | | |
|---|---|---|
| CN | 107333307 | 11/2017 |
| EP | 3634046 B1 | 11/2021 |
| KR | 20130039661 | 4/2013 |
| WO | WO2018077186 | 5/2018 |
| WO | WO2018097684 | 5/2018 |

OTHER PUBLICATIONS

Nan et al., "Advertising WUR Discovery Frame Related Info for Fast Scanning," IEEE 802.11-18/0244rl, dated Feb. 11, 2018, 13 pages, XP068123048.
Chitrakar et al., "Spec Text Update for WUR Discovery," IEEE 802.11-18/1082r0, 802.11ba Draft Specification, Jun. 18, 2018, 6 pages.
Office Action in Chinese Appln. No. 201980003746.9, dated Sep. 23, 2022, 19 pages (with English translation).
Li et al., "Follow-Up on WUR Discovery Frame and Discovery Channel," IEEE 802.11-17/1608r7, dated Nov. 8, 2017, 17 pages.
Chitrakar et al., "Spec Text Update for WUR Discovery," IEEE 802.11--18/0129r0, dated Jun. 18, 2018, 7 pages.

* cited by examiner

FIG. 1
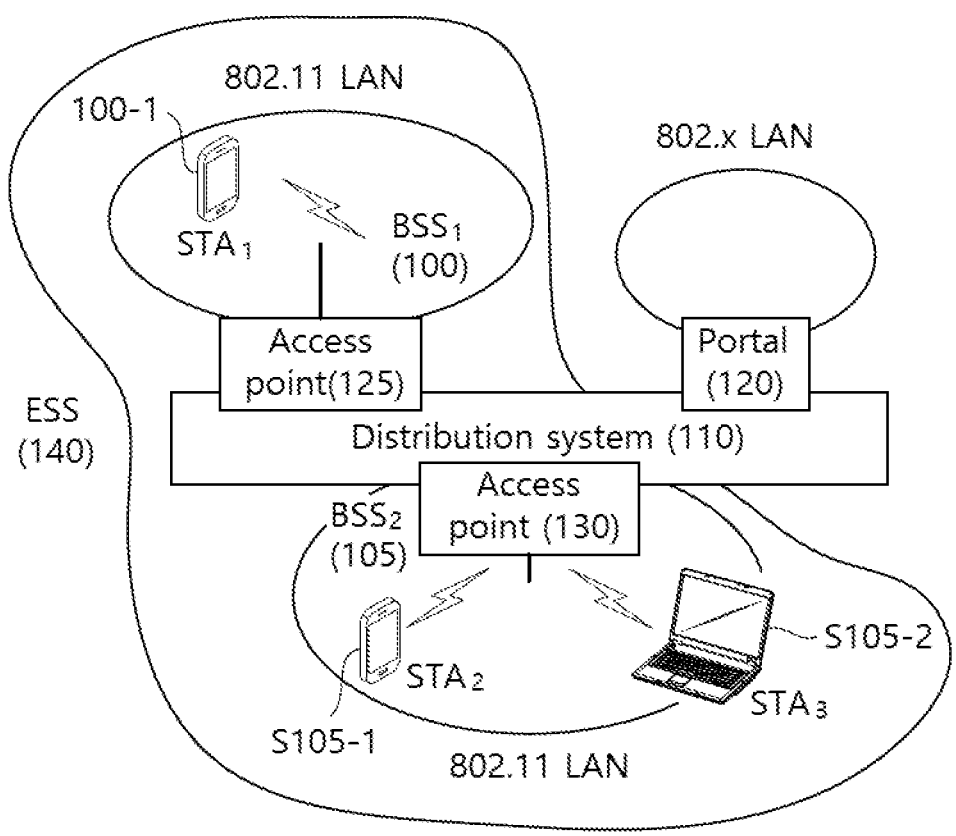
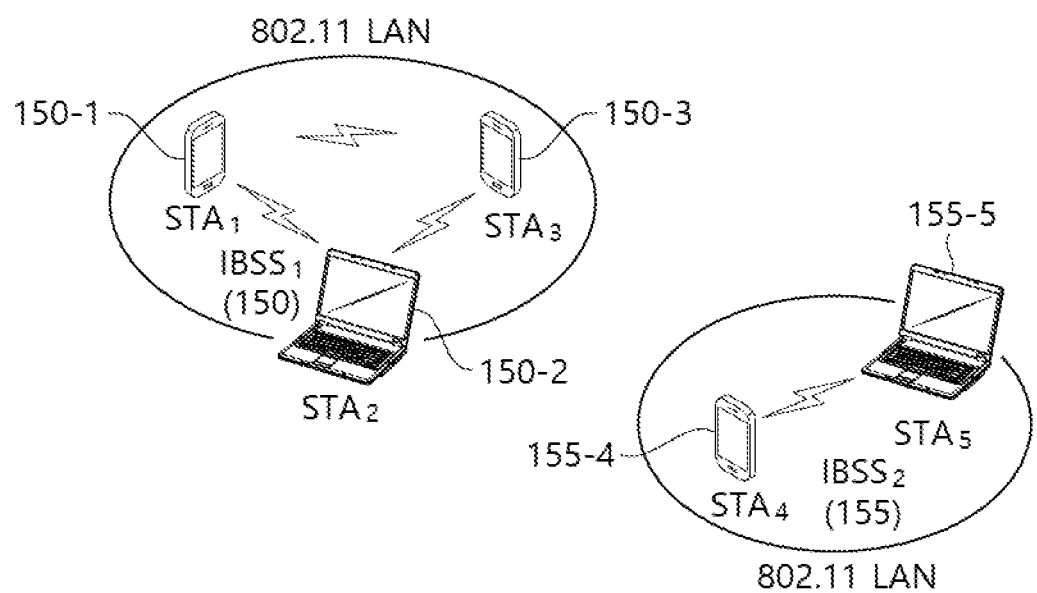

Multi channel transmission using 160MHz bandwidth

| Band | Legacy preamble | BPSK mark | WUR SYNC | WUR payload |
|---|---|---|---|---|
| 20MHz | Legacy preamble | BPSK mark | WUR SYNC | WUR payload |
| 20MHz | Legacy preamble | BPSK mark | WUR SYNC | WUR payload |
| 20MHz | Legacy preamble | BPSK mark | WUR SYNC | WUR payload |
| 20MHz | Legacy preamble | BPSK mark | WUR SYNC | WUR payload |
| 20MHz | Legacy preamble | BPSK mark | WUR SYNC | WUR payload |
| 20MHz | Legacy preamble | BPSK mark | WUR SYNC | WUR payload |
| 20MHz | Legacy preamble | BPSK mark | WUR SYNC | WUR payload |
| 20MHz | Legacy preamble | BPSK mark | WUR SYNC | WUR payload |

FIG. 19

| Element ID | Length | Element ID Extention | Minimum Wake-up Duration | Duty Cycle Period Units | WUR Operation Class |
|---|---|---|---|---|---|
| 1 | 1 | 1 | 1 | 2 | 1 |

Octets :

| WUR Channel | WUR Beacon Period | Offset of Target Wake-up Radio Beacon Transmission Time (TWBTT) | WUR Parameters | WUR Discovery Operating Class (Optional) | WUR Discovery Channel (Optional) |
|---|---|---|---|---|---|
| 1 | 2 | 2 | 1 | 0 or 1 | 0 or 1 |

Octets :

FIG. 20

| Element ID | Length | Element ID Extention | Neighbor AP Information |
|---|---|---|---|
| 1 | 1 | 1 | variable |

Octets:

FIG. 21

| WUR Discovery Operating Class | WUR Discovery Channel | Neighbor AP Count | Neighbor AP List |
|---|---|---|---|

Octets : 1     1     1     variable

FIG. 26

| WUR Discovery Operating Class | WUR Discovery Channel | Neighbor AP Count | Neighbor AP List | WUR Discovery Period |
|---|---|---|---|---|
| 1 | 1 | 1 | variable | TBD |

Octets :

FIG. 27

| Short-SSID | Bitmap Control | BSSID | WUR Discovery Period |
|---|---|---|---|

Octets : 1     1     1     TBD

FIG. 30

| Element ID | Length | Element ID Extention | Minimum Wake-up Duration | Duty Cycle Period Units | WUR Operation Class |
|---|---|---|---|---|---|
| 1 | 1 | 1 | 1 | 2 | 1 |

Octets :

| WUR Channel | WUR Beacon Period | Offset of Target Wake-up Radio Beacon Transmission Time (TWBTT) | WUR Parameters | WUR Discovery Operating Class (Optional) | WUR Discovery Channel (Optional) | WUR Discovery Period |
|---|---|---|---|---|---|---|
| 1 | 2 | 2 | 1 | 0 or 1 | 0 or 1 | TBD |

Octets :

METHOD AND DEVICE FOR RECEIVING WUR DISCOVERY FRAME IN WIRELESS LAN SYSTEM

CROSS-REFERENCE TO RELATED APPLICATIONS

This application is a National Stage application under 35 U.S.C. § 371 of International Application No. PCT/KR2019/005254, filed on May 2, 2019, which claims the benefit of Korean Patent Applications No. 10-2018-0072394 filed on Jun. 22, 2018, and No. 10-2018-0073215 filed on Jun. 26, 2018. The disclosures of the prior applications are incorporated by reference in their entirety.

BACKGROUND

Field

The present specification relates to a method for performing low-power communication in a wireless LAN system and, most particularly, to a method and device for receiving a WUR discovery frame in a wireless LAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY

Technical Objects

The present specification proposes a method and device for receiving a WUR discovery frame in a wireless LAN system.

Technical Solutions

An example of the present specification proposes a method and device for receiving a WUR discovery frame in a wireless LAN system.

The present embodiment is performed by an STA, and the STA may correspond to a WUR STA. The present embodiment may reduce the WUR discovery process to a simple process by first receiving information on an AP existing near the STA from a Primary Connectivity Radio (PCR) before performing the WUR discovery process. Thus, the STA may reduce the power and time being consumed during the scanning of a discovery channel.

A station (STA) receives a WUR discovery element from an access point (AP).

The STA receives the WUR discovery frame from a neighbor AP based on the WUR discovery element.

The WUR discovery element includes AP list information. The AP list information includes information on a WUR discovery period. The WUR discovery frame is received during the WUR discovery period.

More specifically, the AP may notify, to the STA, not only information on the AP itself and discovery information but also information on a neighbor AP and discovery information through the WUR discovery element. The STA may receive the WUR discovery frame during a WUR discovery period that is indicated by the AP list information (or the STA may perform a scanning procedure during a WUR discovery period that is indicated by the AP list information).

The WUR discovery element may include WUR AP information. The WUR AP information may include information on a WUR discovery operating class, information on a WUR discovery channel, and information on a number of WUR APs.

The STA may scan a WUR discovery channel during the WUR discovery period.

The WUR discovery channel may be detected based on information on the WUR discovery channel.

The WUR discovery frame may be received through the WUR discovery channel.

The STA may detect an operating class that is used for a transmission of the WUR discovery frame based on the information on the WUR discovery operating class.

The AP list information may include a parameter of the neighbor AP. The parameter of the neighbor AP may include an identifier of the neighbor AP and information on the WUR discovery period.

The parameter of the neighbor AP may further include parameter control information. The parameter control information may include first information on the presence or absence of an identifier of the neighbor AP and second information on the presence or absence of the WUR discovery period.

The information on the WUR discovery period may include a number of time units (TUs) between consecutive WUR discovery frames.

The STA may perform a first association process with the AP before receiving the WUR discovery element. The STA may perform a second association process with the neighbor AP after receiving the WUR discovery frame. The first and second association processes may be performed in the Primary Connectivity Radio (PCR).

The WUR discovery element may be delivered through a PCR beacon frame or a PCR probe response frame. At this point, the STA may obtain information on a WUR discovery period of a neighbor AP through the PCR beacon frame or PCR probe response frame from the AP, and the STA may perform a WUR discovery process based on the received information.

EFFECTS

According to an example of the present specification, by notifying not only channel information of an adjacent WUR AP through a WUR discovery element but also a WUR discovery period to a WUR STA, the AP may notify information on how long the WUR STA is required to perform scanning in a WUR discovery channel of each AP. Thus, the power and time being consumed during the discovery process may be further reduced.

BRIEF DESCRIPTION OF THE DRAWINGS

FIG. 1 is a conceptual view illustrating the structure of a wireless local area network (WLAN).

FIG. 16 shows an example of a wake-up packet structure being transmitted through an 80 MHz band according to the present embodiment.

FIG. 17 shows an example of a wake-up packet structure being transmitted through a 160 MHz band according to the present embodiment.

FIG. 19 shows an example of a WUR Operation element format according to the present embodiment.

FIG. 20 shows an example of a WUR Neighbor AP element format according to the present embodiment.

FIG. 21 shows an example of a Neighbor AP Information subfield according to the present embodiment.

FIG. 26 shows an example of a Neighbor AP Information subfield format proposed in the present embodiment.

FIG. 27 shows an example of a Neighbor AP List subfield format proposed in the present embodiment.

FIG. 30 shows an example of a WUR operation element format proposed in the present embodiment.

DESCRIPTION OF EXEMPLARY EMBODIMENTS

Figure 2:
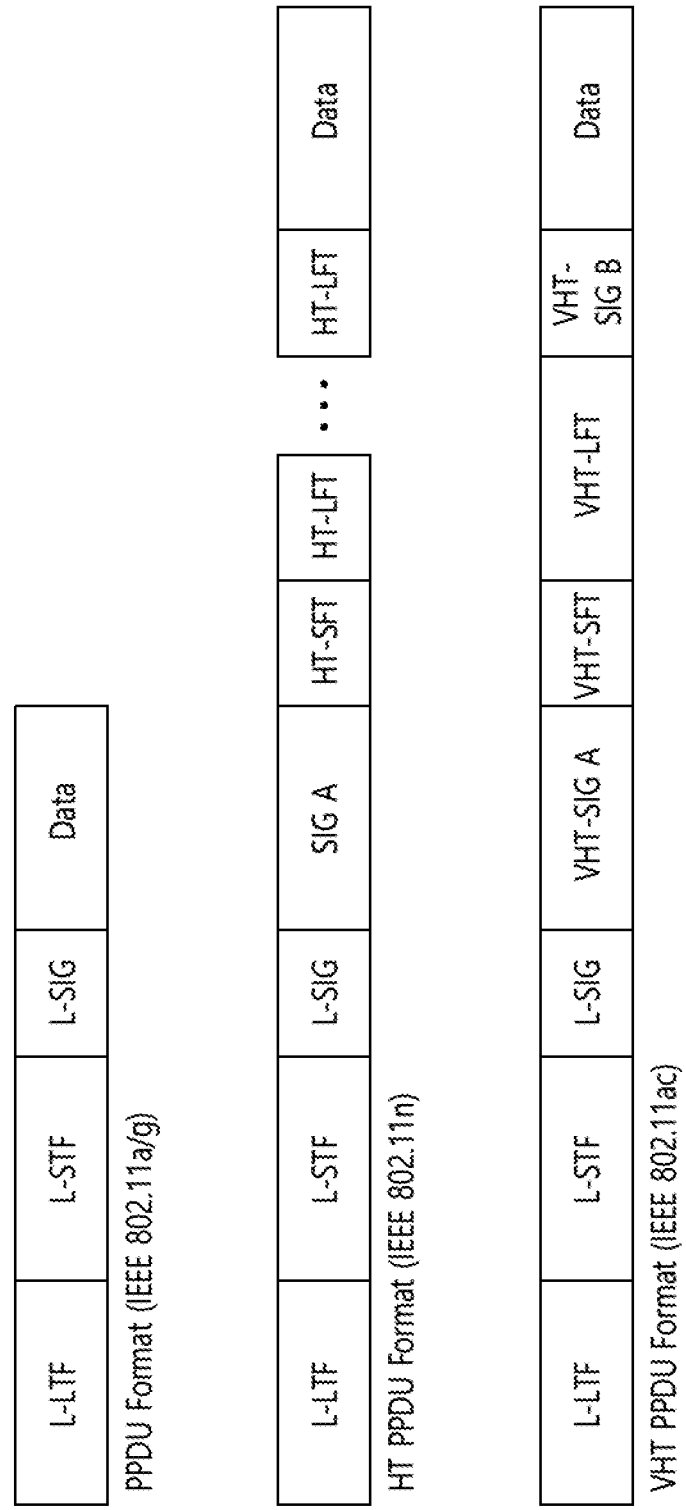
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs (100, 105) (hereinafter, referred to as BSS). The BSSs (100, 105) as a set of an AP and an STA such as an access point (AP) (125) and a station (STA1) (100-1) which are successfully synchronized to communicate with each other are not concepts indicating a specific region. The BSS (105) may include one or more STAs (105-1, 105-2) which may be joined to one AP (130).

The BSS may include at least one STA, APs providing a distribution service, and a distribution system (DS) (110) connecting multiple APs.

The distribution system (110) may implement an extended service set (ESS) (140) extended by connecting the multiple BSSs (100, 105). The ESS (140) may be used as a term indicating one network configured by connecting one or more APs (125, 230) through the distribution system (110). The AP included in one ESS (140) may have the same service set identification (SSID).

A portal (120) may serve as a bridge which connects the wireless LAN network (IEEE 802.11) and another network (e.g., 802.X).

In the BSS illustrated in the upper part of FIG. 1, a network between the APs (125, 130) and a network between the APs (125, 130) and the STAs (100-1, 105-1, 105-2) may be implemented. However, the network is configured even between the STAs without the APs (125, 130) to perform communication. A network in which the communication is performed by configuring the network even between the STAs without the APs (125, 130) is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs (150-1, 150-2, 150-3, 155-4, 155-5) are managed by a distributed manner. In the IBSS, all STAs (150-1, 150-2, 150-3, 155-4, 155-5) may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

The term 'user' may be used in various meanings. For example, the term 'user' may be used to mean a STA participating in uplink MU MIMO and/or uplink OFDMA transmission in wireless LAN communication, But is not limited thereto.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is related to a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
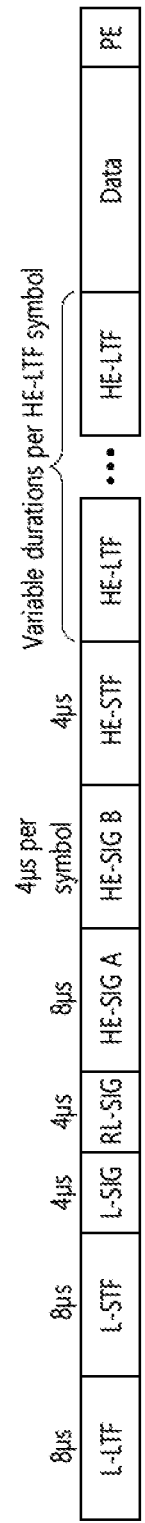
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 µs).

A PPDU that is used in the IEEE standard is described as a PPDU structure being transmitting mainly within a channel bandwidth of 20 MHz. A PPDU structure that is transmitted within a bandwidth (e.g., 40 MHz, 80 MHz) that is wider than the channel bandwidth of 20 MHz may be a structure applying linear scaling of the PPDU structure being used in the channel bandwidth of 20 MHz.

The PPDU that is used in the IEEE standard is generated based on a 64 Fast Fourier Transform (FFT), and a cyclic prefix (CP) portion may be ¼. In this case, the length of a valid (or effective) symbol section (or FFT section) may be equal to 3.2 us, a CP length may be equal to 0.8 us, and a symbol duration may be equal to 4 us (=3.2 us+0.8 us), which is a sum of the length of the valid symbol section and the CP length.

A wireless network is ubiquitous, and the wireless network is generally installed indoors but is also often installed outdoors. The wireless network transmits and receives information by using diverse techniques. For example, although the wireless network will not be limited only to this, two of the most broadly supplied techniques that are used for communication are an IEEE 802.11n standard and an IEEE 802.11ac standard, which follow the IEEE 802.11 standard.

The IEEE 802.11 standard designates a common Medium Access Control (MAC) layer, which provides diverse functions for operating the IEEE 802.11 based wireless LAN (WLAN). The MAC layer controls access of shared radio, and, by using a protocol that enhances communication through a radio medium, the MAC layer manages and maintains communication between IEEE 802.11 stations (e.g., a wireless network card (NIC) of a personal computer (PC), another wireless device or stations (STA), and an access point (AP)).

As the next new product of the 802.11ac, IEEE 802.11ax was proposed in order to enhance efficiency of a WLAN network, most particularly, in high-density regions, such as public hotspots and other high-traffic regions. Additionally, the IEEE 802.11 may also use orthogonal frequency division multiple access (OFDMA). A High Efficiency WLAN study group (HEW SG) within an IEEE 802.11 Work Group considers an enhancement in spectrum efficiency in order to enhance the system throughput/surface in a high-density scenario of an access point (AP) and/or station (STA).

Although small computing devices, such as wearable devices, sensors, mobile devices, and so on, are restricted due to their compact battery capacity, small computing devices support wireless communication techniques, such as Wi-Fi, Bluetooth®, Bluetooth® Low Energy (BLE), and so on, and, then, the small computing devices should exchange data by being connected to other computing devices, such as smart phones, tablets, personal computers, and so on. Since such communication consumes power, it is important to minimize power consumption of such communication. One of the most ideal strategies for minimizing power consumption is to maintain data transmission and reception without excessively increasing delay (or latency) and to turn off the power for communication blocks as frequently as possible. More specifically, a communication block is transmitted immediately before data reception, and the communication block is turned on only when data that needs to be woken up exists, and, during the rest of the time, the power of the communication block is turned off.

Hereinafter, a Low-Power Wake-Up Receiver (LP-WUR) will be described in detail.

The communication system (or communication sub-system) that is described in this specification includes a main radio (802.11) and a low-power wake-up receiver.

The main radio is used for the transmission and reception of user data. The main radio is turned off when there is no data or packet that is to be transmitted. The low-power wake-up receiver wakes up the main radio when there is a packet that is to be received. At this point, the user data is transmitted and received by the main radio.

The low-power wake-up receiver is not used (or provide) for the user data. The low-power wake-up receiver is a receiver for simply waking up the main radio. More specifically, the low-power wake-up receiver does not include a transmitter. The low-power wake-up receiver is activated while the main radio is turned off. During its activated state, the low-power wake-up receiver aims to achieve its target power consumption of less than 1 mW. Additionally, the low-power wake-up receiver uses a narrow band of less than 5 MHz. Furthermore, a target transmission range of the low-power wake-up receiver is the same as a target transmission range of the legacy 802.11.

Figure 4:
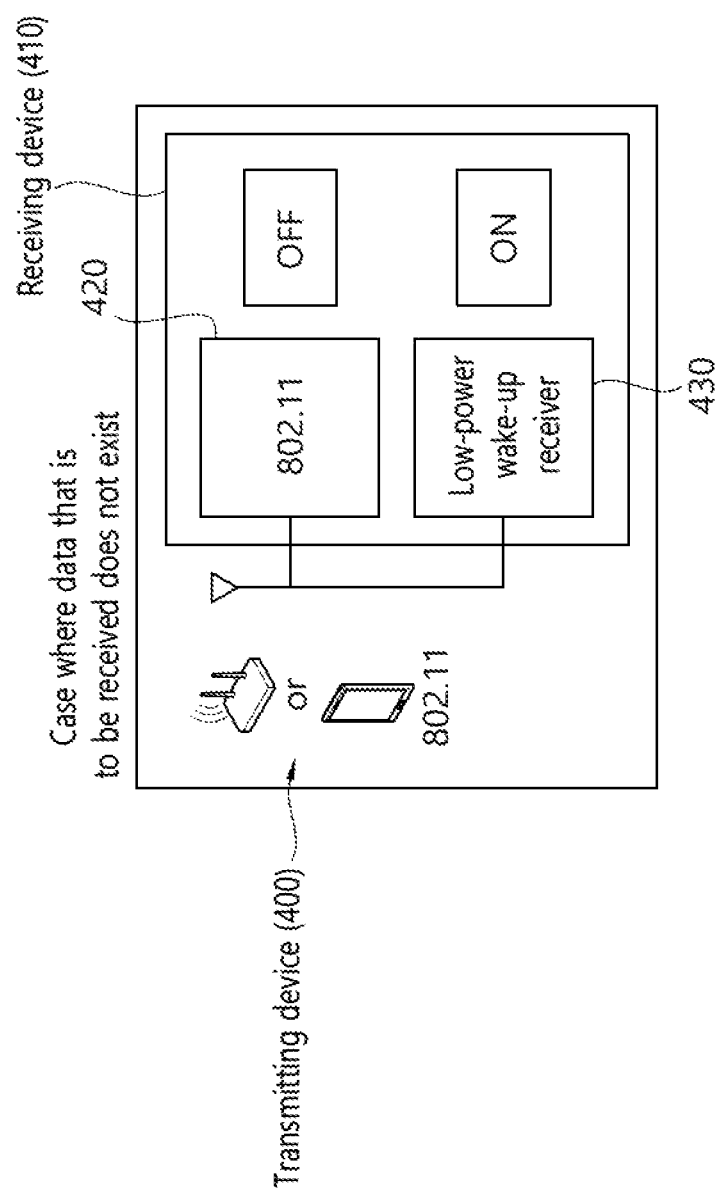
FIG. 4 is a diagram illustrating a low-power wake-up receiver in an environment where data is not received.
Figure 5:
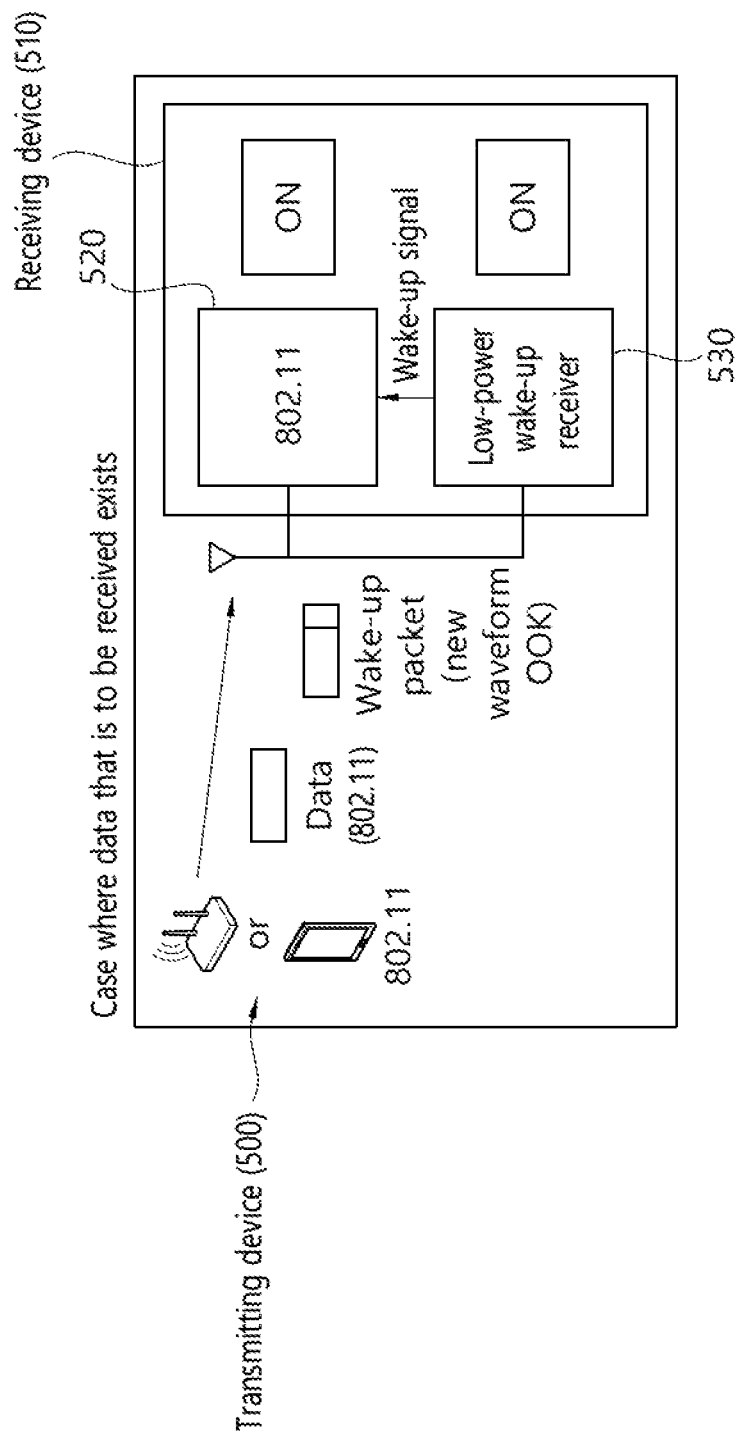
FIG. 5 is a diagram illustrating a low-power wake-up receiver in an environment where data is received.

FIG. 4 is a diagram illustrating a low-power wake-up receiver in an environment where data is not received. FIG. 5 is a diagram illustrating a low-power wake-up receiver in an environment where data is received.

As shown in FIG. 4 and FIG. 5, in case data that is to be transmitted and received exists, one of the methods for implementing the most ideal transmission and reception strategy is to add a low-power wake-up receiver (LP-WUR) that is capable of waking up a main radio, such as Wi-Fi, Bluetooth® radio, Bluetooth® Low Energy (BLE) radio, and so on.

Referring to FIG. 4, the Wi-Fi/BT/BLE radio (420) is turned off, and the low-power wake-up receiver (430) is turned on in a state where data is not received. According to part of the related studies, the power consumption of such low-power wake-up receiver (LP-WUR) may be less than 1 mW.

However, as shown in FIG. 5, if a wake-up packet is received, the low-power wake-up receiver (530) wakes up the entire (or whole) Wi-Fi/BT/BLE radio (520) so that a data packet following the wake-up packet can be accurately received. However, in some cases, actual data or an IEEE 802.11 MAC frame may be included in the wake-up packet. In this case, although the entire Wi-Fi/BT/BLE radio (520) cannot be woken up, the necessary process should be carried out by waking up only part of the Wi-Fi/BT/BLE radio (520). This may result in a considerable amount of power saving.

An exemplary technique that is described in this specification defines a method of a segmented wake-up mode for a Wi-Fi/BT/BLE radio using a low-power wake-up receiver. For example, actual data being included in a wake-up packet may be directly delivered to a memory block without waking up the Wi-Fi/BT/BLE radio.

As another example, in case an IEEE 802.11 MAC frame is included in the wake-up packet, only a MAC processor of the Wi-Fi/BT/BLE wireless device (or radio) needs to be woken up in order to process the IEEE 802.11 MAC frame, which is included in the wake-up packet. More specifically, the power of a PHY module of the Wi-Fi/BT/BLE radio may be turned off or maintained in a low-power mode.

Since a plurality of segmented wake-up modes for a Wi-Fi/BT/BLE radio using a low-power wake-up receiver are defined, when a wake-up packet is received, the power of the Wi-Fi/BT/BLE radio must be turned on. However, according to the exemplary embodiment of this specification, only a necessary (or required) part (or configuration element) of the Wi-Fi/BT/BLE radio may be selectively woken up, thereby saving a larger amount of energy and reducing stand-by (or waiting) time. A large number of solutions using the pow-power wake-up receiver wakes up the entire Wi-Fi/BT/BLE radio when receiving a wake-up packet. According to an exemplary aspect that is discussed in this specification, since only a part (or element) of the Wi-Fi/BT/BLE radio that is required for processing the receiving data is woken up, a considerable amount of energy is saved, and unnecessary stand-by (or waiting) time that is needed for waking up the main radio may be reduced.

Additionally, according to this exemplary embodiment, the low-power wake-up receiver (530) may wake up the main radio (520) based on the wake-up packet that is transmitted from a transmitting device (500).

Furthermore, the transmitting device (500) may be configured to transmit the wake-up packet to a receiving device (510). For example, the transmitting device (500) may instruct the low-power wake-up receiver (530) to wake up the main radio (520).

Figure 6:
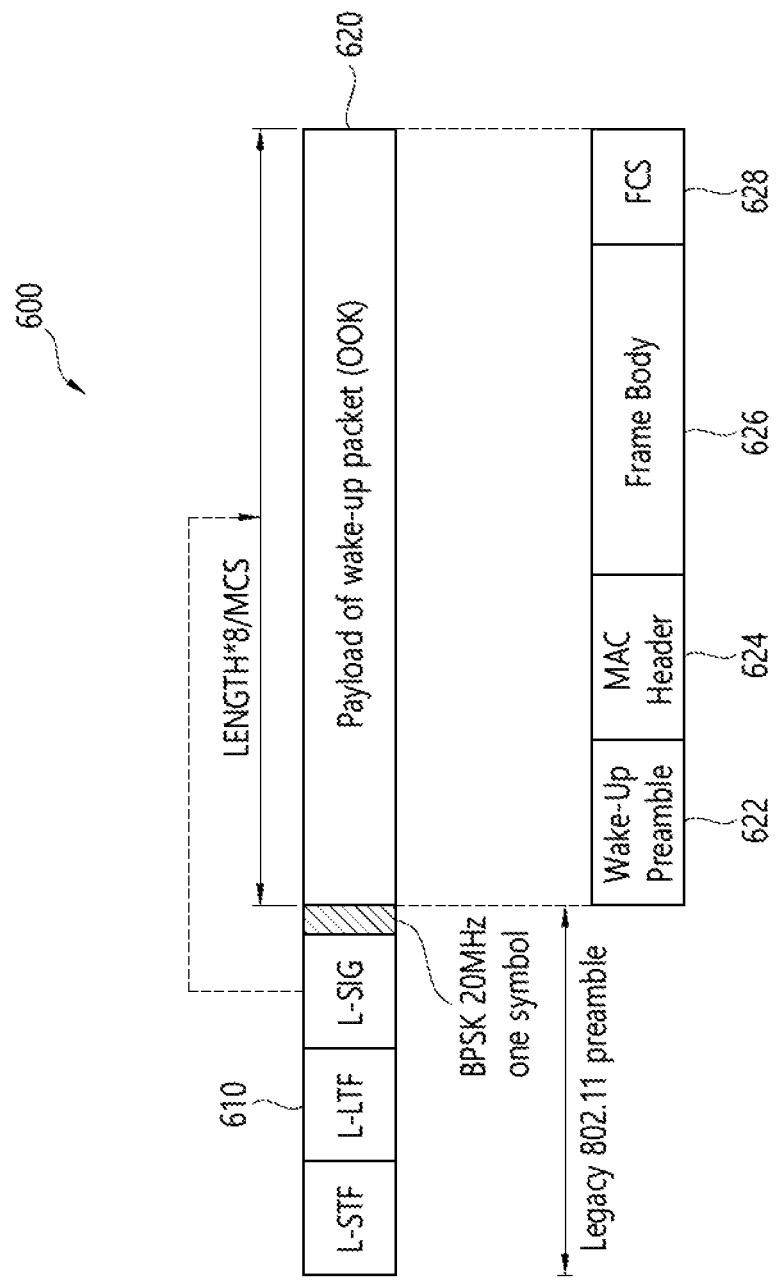
FIG. 6 illustrates an example of a wake-up packet structure according to an exemplary embodiment of this specification.

FIG. 6 illustrates an example of a wake-up packet structure according to an exemplary embodiment of this specification.

A wake-up packet may include one or more legacy preambles. One or more legacy devices may decode or process the legacy preamble(s).

Additionally, the wake-up packet may include a payload after a legacy preamble. The payload may be modulated by using a simple modulation scheme, e.g., an On-Off Keying (OOK) scheme.

Referring to FIG. 6, the transmitting device may be configured to generate and/or transmit a wake-up packet (600). And, the receiving device may be configured to process the received wake-up packet (600).

Additionally, the wake-up packet (600) may include a legacy preamble, which is defined by the IEEE 802.11 specification, or another random preamble (610). And, the wake-up packet (600) may also include a payload (620).

A legacy preamble provides a coexistence with a legacy STA. The legacy preamble (610) for the coexistence uses an L-SIG field for protecting the packet. Through the L-SIG field within the legacy preamble (610), an 802.11 STA may detect a beginning (or a start point) of the legacy preamble (610). And, through the L-SIG field within the legacy preamble (610), the 802.11 STA may know (or acknowledge) an end (or last part) of the packet. Additionally, by adding a symbol that is modulated by using BPSK after the L-SIG, a false alarm of an 802.11n terminal (or device) may be reduced. A symbol (4 us) that is modulated by using BPSK also has a 20 MHz bandwidth, just as the legacy part. The legacy preamble (610) is a field for a third party legacy STA (an STA not including an LP-WUR). The legacy preamble (610) is not decoded by the LP-WUR.

The payload (620) may include a wake-up preamble (622). The wake-up preamble (622) may include a sequence of bits that are configured to identify the wake-up packet (600). The wake-up preamble (622) may, for example, include a PN sequence.

Additionally, the payload (620) may include a MAC header (624) including address information of a receiving device, which receives the wake-up packet (600), or an identifier of the receiving device.

Additionally, the payload (620) may include a frame body (626), which may include other information of the wake-up packet. For example, length or size information of the payload may be included in the frame body (626).

Furthermore, the payload (620) may include a frame check sequence (FCS) field (628) including a cyclic redundancy check (CRC) value. For example, the FCS field (628) may include a CRC-8 value or a CRC-16 value of the MAC header (624) and the frame body (626).

Figure 7:
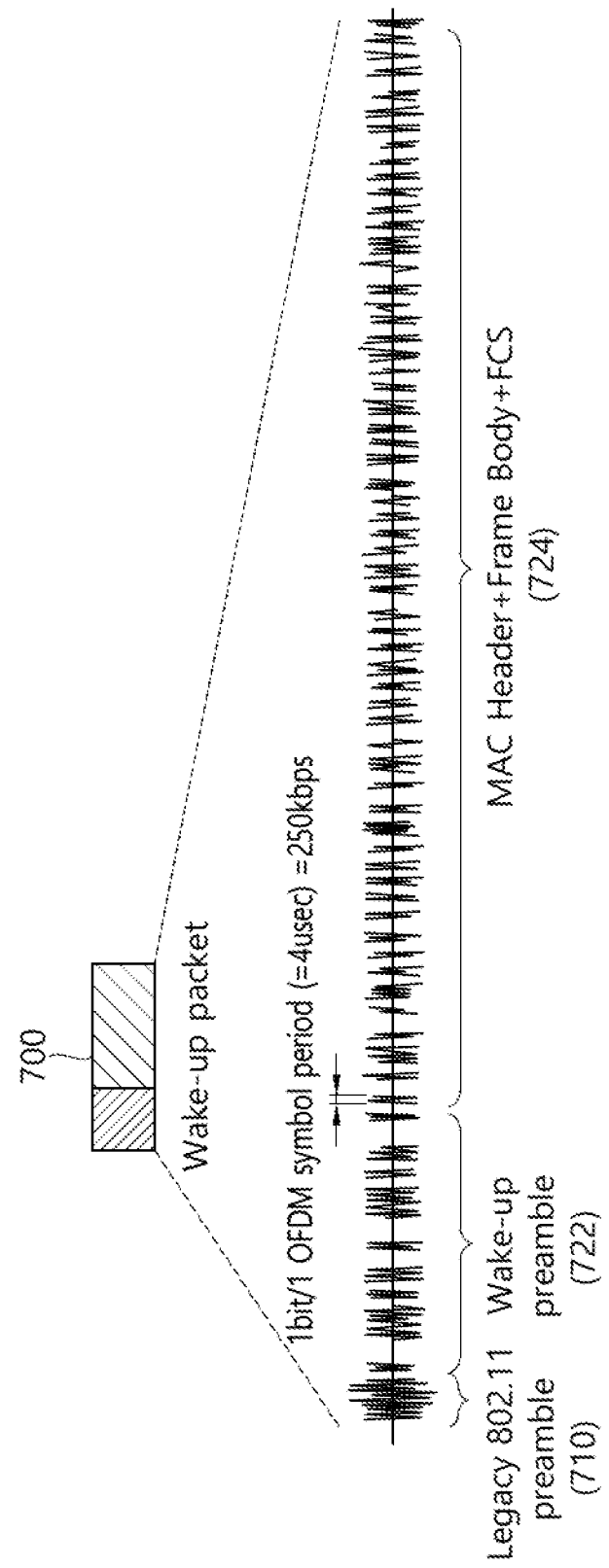
FIG. 7 illustrates a signal waveform of a wake-up packet according to an exemplary embodiment of this specification.

FIG. 7 illustrates a signal waveform of a wake-up packet according to an exemplary embodiment of this specification.

Referring to FIG. 7, a wake-up packet (700) includes a legacy preamble (802.11 preamble (710) and a payload being modulated by OOK. In other words, the wake-up packet (700) is configured of a format in which a legacy preamble and a new LP-WUR signal waveform coexist.

Additionally, the legacy preamble (710) may be modulated in accordance with an OFDM modulation scheme. More specifically, the OOK scheme is not applied to the legacy preamble (710). Conversely, the payload may be modulated in accordance with the OOK scheme. However, a wake-up preamble (722) within the payload may be modulated in accordance with a different modulation scheme.

If the legacy preamble (710) is transmitted within a channel bandwidth of 20 MHz in which 64 FFT is applied, the payload may be transmitted within a channel bandwidth of approximately 4.06 MHz. This will be described in more detail in the following description of an OOK pulse designing method.

Firstly, a modulation method using the OOK scheme and a Manchester coding method will be described in detail.

Figure 8:
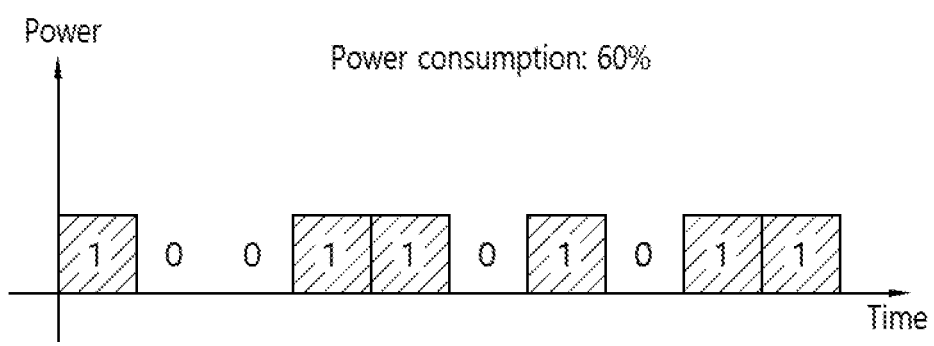
FIG. 8 illustrates a diagram for describing a principle for determining consumed power in accordance with a ratio between bit value 1 and 0 that configure information of a binary sequence format by using the OOK scheme.

FIG. 8 illustrates a diagram for describing a principle for determining consumed power in accordance with a ratio between bit value 1 and 0 that configure information of a binary sequence format by using the OOK scheme.

Referring to FIG. 8, information of a binary sequence format having 1 or 0 as the bit values is expressed in the drawing. By using such bit values of 1 or 0 of the binary sequence format information, an OOK modulation scheme communication may be carried out. More specifically, by considering the bit values of the binary sequence format information, the OOK modulation scheme communication may be carried out. For example, in case of using a light-emitting diode in visible light communication, in case the bit value configuring the binary sequence format information is equal to 1, the light-emitting diode is turned on, and, in case the bit value is equal to 0, the light-emitting diode is turned off. Thus, the light-emitting diode may be turned on and off (i.e., flicker). As the receiving device receives and recovers the data being transmitted in the form of visible light in accordance with the above-described on and off state (or flickering) of the light-emitting diode, the communication using visible light may be carried out. However, since the flickering of the light-emitting diode cannot be recognized by the human eye, people think and feel that the lighting is continuously maintained in the on state.

For simplicity in the description, as shown in FIG. 8, information of a binary sequence format having 10 bit values is used in this specification. Referring to FIG. 8, information of a binary sequence format having a value of '1001101011'. As described above, in case the bit value is equal to 1, the transmitting device is turned on, and, in case the bit value is equal to 0, the transmitting device is turned off. Accordingly, among the 10 bit values, the symbols are turned on in 6 bit values. In this case, given that 100% of the consumed power is used when all of the symbols are turned on in all of the 10 bit values, and, in case a duty cycle shown in FIG. 8 is followed, the consumed power is 60%.

More specifically, it may be said that the consumed power of the transmitter is determined in accordance with a ratio between 1s and 0s configuring the binary sequence format information. In other words, in case there is a constraint condition specifying that the consumed power of the transmitter should be maintained at a specific value, the ratio between the 1s and 0s configuring the binary sequence format information should also be maintained. For example, in case of a lighting device, since the lighting should be maintained at a specific luminance value that is wanted by the users, the ratio between the 1s and 0s configuring the binary sequence format information should also be maintained accordingly.

However, for the wake-up receiver (WUR), since the receiving device is the subject, the transmission power is not significantly important. One of the main reasons for using the OOK is because the amount of consumed power during the decoding of a received signal is considerably small. Before performing the decoding, the difference between the amount of consumed power in the main radio and in the WUR is small. However, as the decoding process is carried out, the difference in the amount of consumed power becomes apparent. The approximate amount of consumed power is as shown below.

The current Wi-Fi power consumption is approximately 100 mW. More specifically, power may be consumed as follows: Resonator+Oscillator+PLL (1500 uW)->LPF (300 uW)->ADC (63 uW)->decoding processing (OFDM receiver) (100 mW).

However, the WUR power consumption is approximately 1 mW. More specifically, power may be consumed as follows: Resonator+Oscillator (600 uW)->LPF (300 uW)->ADC(20 uW)->decoding processing (Envelope detector) (1 uW).

Figure 9:
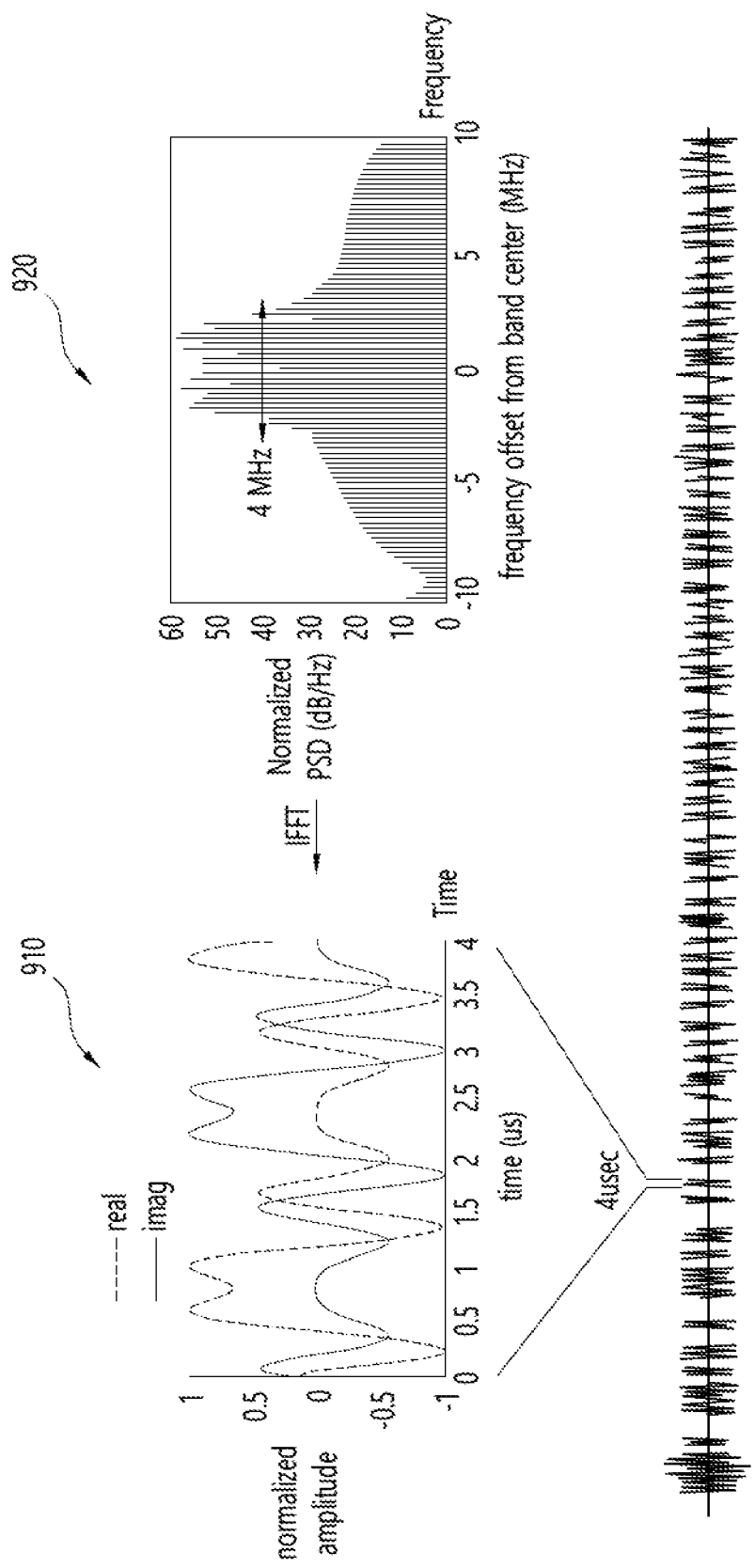
FIG. 9 illustrates a method for designing an OOK pulse according to an exemplary embodiment of this specification.

FIG. 9 illustrates a method for designing an OOK pulse according to an exemplary embodiment of this specification.

In order to generate an OOK pulse, an OFDM transmitting device of 802.11 may be re-used. The transmitting device may generate a sequence having 64 bits by applying 64-point FFT, just as in the legacy 802.11.

The transmitting device should generate the payload of a wake-up packet by performing modulation using the OOK scheme. However, since the wake-up packet is used for low-power communication, the OOK scheme is applied to the ON-signal. Herein, the ON-signal is a signal having the actual power value, and an OFF-signal corresponds to a signal that does not have an actual power value. Although the OOK scheme is also applied to the OFF-signal, since the OFF-signal is not a signal that is generated by using the transmitting device, and, accordingly, since the signal is not actually transmitted, the OFF-signal is not considered when generating the wake-up packet.

In the OOK scheme, Information (bit) 1 may be the ON-signal, and Information (bit) 0 may be the OFF-signal. On the other hand, if the Manchester coding method is applied, it may be indicated that Information 1 is shifted from the OFF-signal to the ON-signal, and that Information 0 is shifted from the ON-signal to the OFF-signal. Conversely, it may also be indicated that Information 1 is shifted from the ON-signal to the OFF-signal, and that Information 0 is shifted from the OFF-signal to the ON-signal. The Manchester coding method will be described later on in detail.

Referring to FIG. 9, as shown in the right side frequency domain graph (920), the transmitting device selects 13 consecutive subcarriers of the reference band, 20 MHz band, as a sample and applies a sequence. In FIG. 9, among the subcarriers of the 20 MHz band, the 13 subcarriers that are located in the middle are selected as the sample. More specifically, among the 64 subcarriers, the transmitting device selects subcarriers having subcarriers indexes ranging from −6 to +6. At this point, since subcarrier index 0 is a DC subcarrier, this subcarrier may be nulled as 0. A specific sequence is configured only in the sample of the selected 13 subcarriers, and all of the remaining subcarriers excluding the 13 selected subcarriers (subcarrier indexes ranging from −32 to −7 and subcarrier indexes ranging from +7 to +31) are set to 0.

Additionally, since subcarrier spacing is 312.5 KHz, the 13 subcarriers have a channel bandwidth of approximately 4.06 MHz. More specifically, it may be understood that, in the 20 MHz band of the frequency domain, power exists only in 4.06 MHz. Thus, as described above, by focusing the power to the center, it will be advantageous in that a Signal to Noise Ratio (SNR) may be increased, and that power consumption in an AC/DC converter of the receiving device may be reduced. Additionally, since the sampling frequency band is reduced to 4.06 MHz, the amount of the consumed power may be reduced accordingly.

Additionally, as shown in the left side time domain graph (910), the transmitting device performs 64-point IFFT on the 13 subcarriers, so as to generate one ON-signal in the time domain. One ON-signal has the size of 1 bit. More specifically, a sequence being configured of 13 subcarriers may correspond to 1 bit. Conversely, the transmitting device may bot transmit the OFF-signal at all. By performing IFFT, a symbol of 3.2 us may be generated, and, if a cyclic prefix (CP) (0.8 us) is included, one symbol having the length of 4 us may be generated. More specifically, 1 bit indicating one ON-signal may be loaded in one symbol.

The reason for configuring and transmitting a bit, as described in the above-described exemplary embodiment, is to reduce power consumption in the receiving device by using an envelope detector. Thus, the receiving device may decode a packet with a minimum amount of power.

However, a basic data rate for one information may be 125 Kbps (8 us) or 62.5 Kbps (16 us).

By generalizing the description presented above, a signal being transmitted from the frequency domain is as described below. More specifically, each signal having a length of K within the 20 MHz band may be transmitted by being loaded in K number of consecutive subcarriers, among the total of 64 subcarriers. More specifically, as a number of subcarriers being used for transmitting a signal, the value K may correspond to the bandwidth of an OOK pulse. Coefficients of subcarriers other than the K number of subcarriers are equal to 0. At this point, indexes of the K number of subcarriers being used by a signal corresponding to information 0 and information 1 are the same. For example, a subcarrier index that is being used may be indicated as 33-floor(K/2): 33+ceil(K/2)−1.

At this point, Information 1 and Information 0 may have the following values.

Information 0=zeros(1,K)
Information 1=alpha*ones(1,K)

The alpha is a power normalization factor and may, for example, be equal to 1/sqrt(K).

Figure 10:
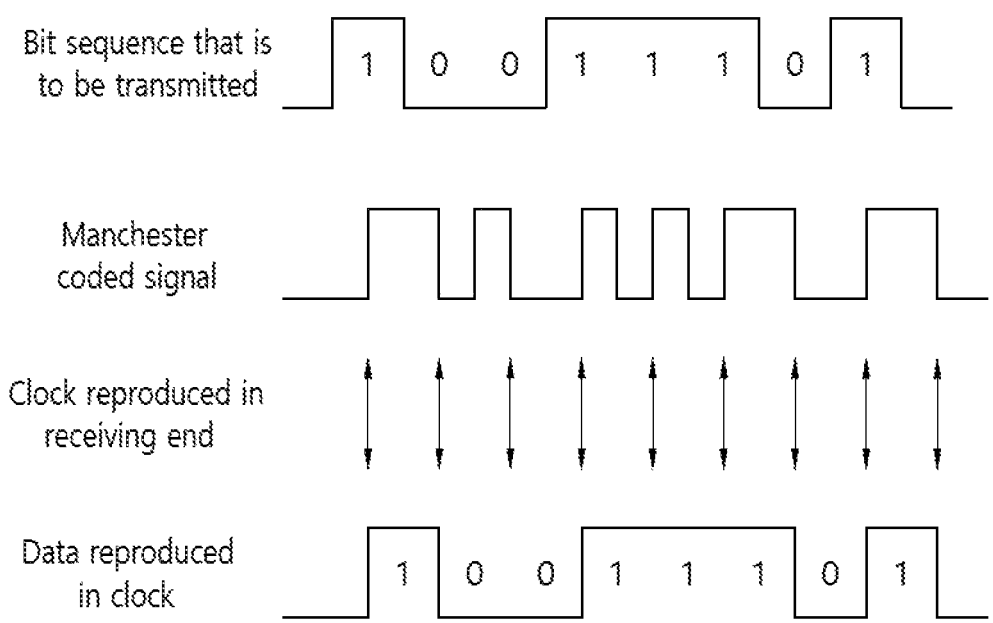
FIG. 10 is a descriptive diagram of a Manchester coding method according to an exemplary embodiment of this specification.

FIG. 10 is a descriptive diagram of a Manchester coding method according to an exemplary embodiment of this specification.

Manchester coding is a type of line coding method in which a transition in a magnitude value occurs at a midpoint of one bit period. And, information of this method may be indicated as shown below in the following table.

TABLE 1

| Original data | | Clock | | Manchester value |
|---|---|---|---|---|
| 0 | = | 0 | XOR | 0 |
|   |   | 1 |   | 1 |
| 1 |   | 0 |   | 1 |
|   |   | 1 |   | 0 |

More specifically, the Manchester coding method (or technique) refers to a method of converting data from 1 to 01 and from 0 to 10 or from 1 to 10 and from 0 to 01. Table 1 shows an example of data being converted from 1 to 10 and from 0 to 01 by using Manchester coding.

As shown in FIG. 10, from top to bottom, the drawing illustrates a bit sequence that is to be transmitted, a Manchester coded signal, a clock that is reproduced by the receiving end, and data that is reproduced by the clock.

If data is transmitted from the transmitting end by using the Manchester coding method, the receiving end reads the data after a brief moment based on a transition point, wherein transition of 1→0 or 0→1 occurs. Then, after recovering the data and recognizing the transition point of transitioning 1→0 or 0→1 as the transition point of the block, the clock is recovered. Alternatively, when a symbol is divided based on the transition point, a simple decoding may be performed by comparing the power level of the front part of the symbol and the power level of the back part of the symbol based on the midpoint of the symbol.

As shown in FIG. 10, the bit sequence that is to be transmitted is 10011101, and the bit sequence that is to be transmitted being processed with Manchester coding is 0110100101011001, the clock that is reproduced in the receiving end recognizes a transition point of the Manchester-coded signal as the transition point of the block, and, then, data is recovered by using the clock, which is reproduced as described above.

When using the above-described Manchester coding method, communication may be carried out in a synchronization method by using only a data transmission channel and without using a separate clock.

Additionally, in the above-described, by using only the data transmission channel, a TXD pin may be used for data transmission, and an RXD pin may be used for data reception. Therefore, a synchronized two-way transmission may be performed.

This specification proposes diverse symbol types that can be used in a WUR and the corresponding data rate.

Since STAs requiring robust performance (or capacity) and STAs receiving intense signals from an AP are intermixed, depending upon the situation, supporting an efficient data rate is needed. In order to achieve a reliable and robust performance, a symbol-based Manchester coding method and a symbol repetition method may be used. Additionally, in order to achieve a high data rate, a symbol reduction method may be used.

At this point, each symbol may be generated by using the legacy 802.11 OFDM transmitter. And, the number of sub-carriers that are used for generating each symbol may be equal to 13. However, the number of subcarriers will not be limited only to this.

Additionally, each symbol may use OOK modulation, which is configured of an ON-signal and an OFF-signal.

A symbol that is generated for the WUR may be configured of a cyclic prefix (CP) (or a guard interval (GI)) and a signal part indicating actual information. By diversely configuring the lengths of the CP and the actual information signal, or by repeating the CP and the actual information part, a symbol having diverse data rates may be designed.

Diverse example related to the symbol types are shown below.

For example, a basic WUR symbol may be indicated as CP+3.2 us. More specifically, 1 bit is indicated by using a symbol having the same length as the legacy Wi-Fi. Most particularly, the transmitting device performs IFFT after applying a specific sequence to all of the subcarriers that are available for usage (e.g., 13 subcarrier), thereby configuring an information signal part of 3.2 us. At this point, among all of the subcarriers that are available for usage, a coefficient of 0 may be loaded in a DC subcarrier or middle subcarrier index.

Different sequence may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part having a specific length at an end part of the information signal 3.2 us that immediately follows the CP. At this point, the CP may be 0.4 us or 0.8 us. This length is the same length as the guard interval of 802.11ac.

Therefore, a 1-bit information corresponding to one basic WUR symbol may be indicated as shown below in the following table.

TABLE 2

| Information '0' | Information '1' |
|---|---|
| 3.2 us OFF-signal | 3.2 us ON-signal |

Table 2 does not separately indicate the CP. Actually, when including the CP, CP+3.2 us may indicate one 1-bit information. More specifically, the 3.2 us ON-signal may be regarded as a (CP+3.2 us) ON-signal, and the 3.2 us OFF-signal may be regarded as a (CP+3.2 us) OFF-signal.

For example, a symbol having Manchester coding applied thereto may be indicated as CP+1.6 us+CP+1.6 us or CP+1.6 us+1.6 us. The symbol having Manchester coding applied thereto may be generated as described below.

In an OOK transmission using a Wi-Fi transmitting device, the time period used for transmitting one bit (or symbol) excluding the guard interval of the transmitted signal is equal to 3.2 us. At this point, if Manchester coding is also applied, a shift in the signal size (or magnitude) should occur in 1.6 us. More specifically, each sub-information having a length of 1.6 us should be given a value of 0 or 1, and the corresponding signal may be configured by using the method described below.

Information 0->1 0 (Each may be referred to as sub-information 1 0 or sub-symbol 1 (ON) 0 (OFF).)

First 1.6 us (sub-information 1 or sub-symbol 1): Sub-information 1 may be given a value of beta*ones(1,K). Herein, the beta indicates/is related with a power normalization element and may, for example, be equal to 1/sqrt(ceil(K/2)).

Additionally, in order to generate the symbol having Manchester coding applied thereto, a specific sequence is applied to all subcarriers that are available for usage (e.g., 13 subcarriers) in units of 2 spaces. More specifically, each even-number indexed subcarrier of the specific pattern is nulled by using 0. For example, when it is assumed that an ON-signal is configured by using 13 subcarriers, the specific sequence having a coefficient at an interval of 2 spaces may be {a 0 b 0 c 0 d 0 e 0 f 0 g}, {0 a 0 b 0 c 0 d 0 e 0 f 0}, or {a 0 b 0 c 0 0 0 d 0 e 0 f}. At this point, a, b, c, d, e, f, g may be 1 or −1.

More specifically, among the 64 subcarriers, the transmitting device maps the specific sequence to K number of consecutive subcarriers (e.g., 33-floor(K/2): 33+ceil(K/2)−1) and sets a coefficient of 0 for the remaining subcarriers. Thereafter, the transmitting device performs IFFT. Thus, a time domain signal may be generated. Since the time domain signals has coefficients existing at an interval of 2 spaces within the frequency domain, the time domain signal is a 3.2 us-length signal of having a cycle of 1.6 us. One of a first 1.6 us-cycle signal and a second 1.6 us-cycle signal may be selected and used as sub-information 1.

Second 1.6 us (sub-information 0 or sub-symbol 0): Sub-information 0 may be given a value of zeros(1,K). Similarly, among the 64 subcarriers, the transmitting device maps the specific sequence to K number of consecutive subcarriers (e.g., 33-floor(K/2): 33+ceil(K/2)-1) and performs IFFT, thereby generating a time domain signal. Sub-information 0 may correspond to a 1.6 us OFF-signal. The 1.6 us OFF-signal may be generated by setting all of the coefficients to 0.

One of a first 1.6 us-cycle signal and a second 1.6 us-cycle signal of the time domain may be selected and used as sub-information 0. Simply, zero signals (1,32) may also be used as sub-information 0.

Information 1->0 1(Each may be referred to as sub-information '0', '1' or sub-symbol 0 (OFF) 1 (ON).)

Since Information 1 is also divided into a first 1.6 us (sub-information 0) and a second 1.6 us (sub-information 1), a signal corresponding to each sub-information may be configured by using the same method as the method for generating Information 0.

When performing the method for generating Information 0 and Information 1 by using Manchester coding, a consecutive occurrence of OFF-symbols may be prevented as compared to the legacy method. Accordingly, a problem of coexistence with the legacy Wi-Fi device does not occur. The problem of coexistence refers to a problem that occurs when another device transmits a signal after determining that the channel is in a channel idle state, due to the existence of consecutive OFF-symbols. If the OOK modulation is only used, the sequence may, for example, be 100001, wherein the OFF-symbol occurs consecutively. However, if Manchester coding is used, the sequence may be 100101010110, wherein the OFF-symbols cannot be consecutive.

According to the description provided above, the sub-information may be referred to as a 1.6 us information signal. The 1.6 us information signal may be a 1.6 us ON-signal or a 1.6 OFF-signal. The 1.6 us ON-signal and the 1.6 OFF-signal may have different sequences applied thereto in each subcarrier.

The CP may select and use a part having a specific length at an end part of the information signal 1.6 us that immediately follows the CP. At this point, the CP may correspond to 0.4 us or 0.8 us. This length is the same length as the guard interval of 802.11ac.

Therefore, a 1-bit information corresponding to a symbol having Manchester coding applied thereto may be indicated as shown below in the following table.

TABLE 3

| Information '0' | Information '1' |
| --- | --- |
| 1.6 us ON-signal + 1.6 us OFF-signal or 1.6 us OFF-signal + 1.6 us ON-signal | 1.6 us OFF-signal + 1.6 us ON-signal or 1.6 us ON-signal + 1.6 us OFF-signal |

Table 3 does not separately indicate the CP. Actually, when including the CP, CP+1.6 us+CP+1.6 us or CP+1.6 us+1.6 us may indicate one 1-bit information. More specifically, in case of the former structure, the 1.6 us ON-signal and the 1.6 us OFF-signal may be respectively regarded as a (CP+1.6 us) ON-signal and a (CP+1.6 us) OFF-signal.

As yet another example, proposed herein is a method for generating a wake-up packet by repeating symbols in order to enhance performance.

A symbol repetition method is applied to a wake-up payload (724). The symbol repetition method refers to a repetition of time signals after IFFT and cyclic prefix (CP) insertion in each symbol. Thus, the length (time (or duration)) of the wake-up payload (724) becomes two times its initial length.

More specifically, a method for generating a wake-up packet by applying a symbol, which indicates information such as Information 0 or Information 1, to a specific sequence and by repeating this process is proposed as described below.

Option 1: Information 0 and Information 1 may be indicated by being repeated as the same symbol.
Information 0->0 0 (Information 0 is repeated 2 times)
Information 1->1 1 (Information 1 is repeated 2 times)
Option 2: Information 0 and Information 1 may be indicated by being repeated as different symbols.
Information 0->0 1 or 1 0 (Information 0 and Information 1 are repeated)
Information 1->1 0 or 0 1 (Information 1 and Information 0 are repeated)

Hereinafter, a method of decoding a signal, by a receiving device, being transmitted from a transmitting device after applying the symbol repetition method will be described in detail.

The transmitted signal may correspond to a wake-up packet, and a method for decoding the wake-up packet may be broadly divided into two different types. A first type is a non-coherent detection method, and a second type is a coherent detection method. The non-coherent detection method refers to a method wherein a phase relation between signals of the transmitting device and the receiving device is not fixed. Therefore, the receiving device is not required to measure and adjust the phase of the received signal. Conversely, in the coherent detection method, the phase between the signals of the transmitting device and the receiving device is required to be matched.

The receiving device includes the above-described low-power wake-up receiver. In order to reduce power consumption, the low-power wake-up receiver may decode a packet (wake-up packet), which is transmitted by using the OOK modulation scheme, by using an envelope detector.

The envelope detector uses a method of decoding a received signal by measuring the power or magnitude of the corresponding signal. The receiving device determines in advance a threshold value based on the power or magnitude of the received signal, which is measured by using the envelope detector. Thereafter, when the receiving device decodes the symbol having OOK applied thereto, if the symbol is greater than or equal to the threshold value, the symbol is determined as Information 1, and, if the symbol is smaller than the threshold value, the symbol is determined as Information 0.

A method for decoding a symbol having the symbol repetition method applied thereto is as described below. In the above-described Option 1, the receiving device may calculate the power corresponding to a case where Symbol 1 (symbol including Information 1) is transmitted by using a wake-up preamble (722) and may use the calculated power to determine a threshold value.

More specifically, when an average power level between two symbols is calculated, and, if the calculated average power level is equal to or greater than the threshold value, the symbol is determined as Information 1 (1 1). And, if the calculated average power level is equal to or smaller than the threshold value, the symbol is determined as Information 0 (0 0).

Additionally, in the above-described Option 2, the information may be determined by comparing the power levels of the two symbols without performing the process of determining the threshold value.

More specifically, when it is given that Information 1 is configured of 0 1 and that Information 0 is configured of 1 0, if the power level of a first symbol is greater than the power level of a second symbol, the information is determined as Information 0. Conversely, if the power level of the first symbol is smaller than the power level of the second symbol, the information is determined as Information 1.

The order of the symbols may be reconfigured by an interleaver. Herein, the interleaver may be applied in packet units and units of a specific number of symbols.

Figure 11:
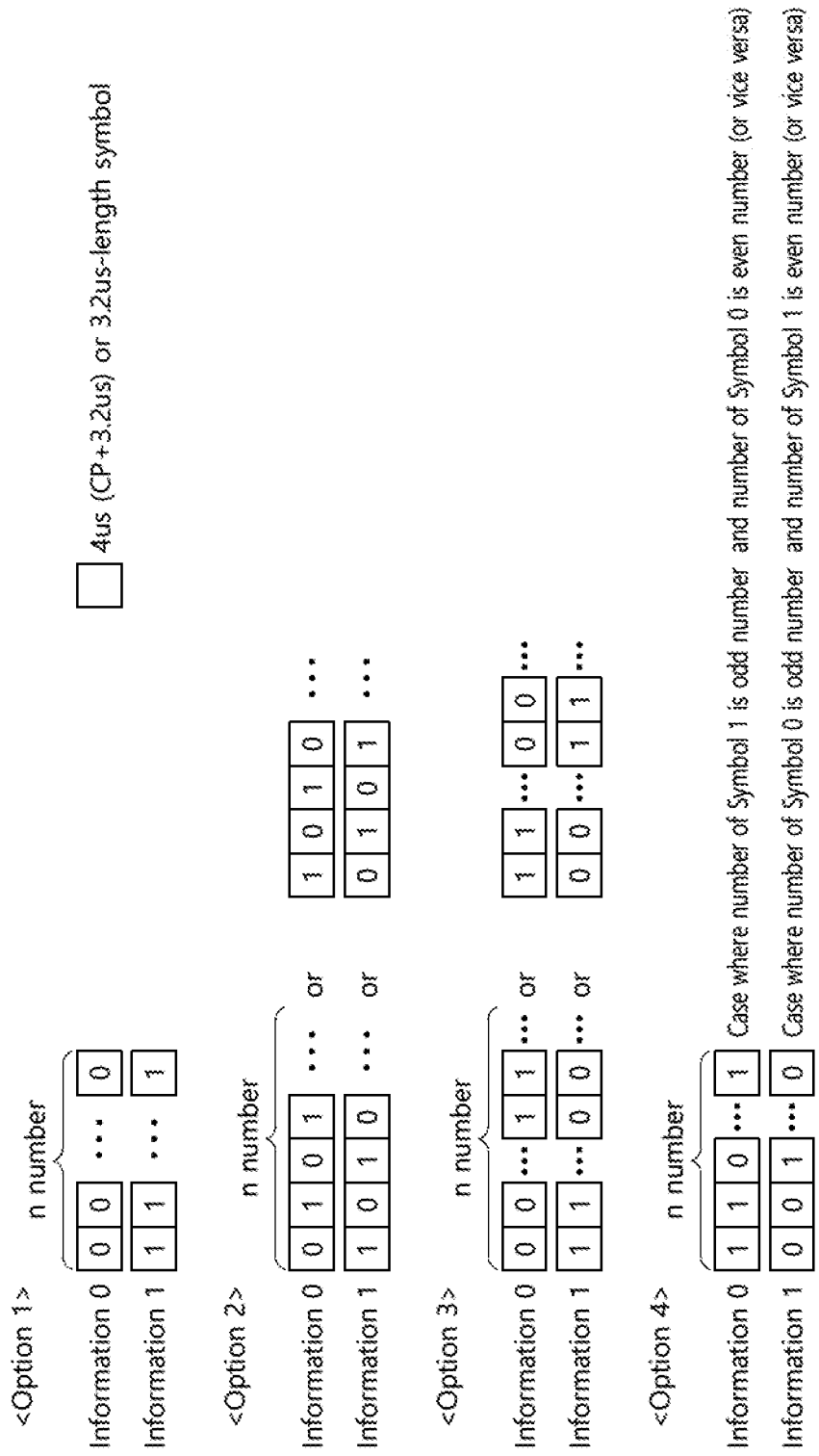
FIG. 11 illustrates various examples of a symbol repetition method repeating n number of symbols according to an exemplary embodiment of this specification.

Moreover, in addition to two symbols, the symbol repetition may be extended by using n number of symbols, as described below. FIG. 11 illustrates various examples of a symbol repetition method repeating n number of symbols according to an exemplary embodiment of this specification.

Option 1: As described in FIG. 11, Information 0 and Information 1 may be indicated by being repeated n number of times as the same symbol.
Information 0->0 0 . . . 0 (Information 0 is repeated n number of times)
Information 1->1 1 . . . 1 (Information 1 is repeated n number of times)
Option 2: As described in FIG. 11, Information 0 and Information 1 may be indicated by being repeated n number of times as different symbols.
Information 0->0 1 0 1 . . . or 1 0 1 0 . . . (Information 0 and Information 1 are alternately repeated n number of times)
Information 1->1 0 1 0 . . . or 0 1 0 1 . . . (Information 1 and Information 0 are alternately repeated n number of times)
Option 3: As described in FIG. 11, n number of symbols may be indicated by configuring one half of the symbols of Information 0 and by configuring another half of the symbols of Information 1.

Information 0->0 0 . . . 1 1 . . . or 1 1 . . . 0 0 . . . (n/2 number of symbols is configured of Information 0, and the remaining n number of symbols is configured of Information 1)

Information 1->1 1 . . . 0 0 . . . or 0 0 . . . 1 1 . . . (n/2 number of symbols is configured of Information 0, and the remaining n number of symbols is configured of Information 1)

Option 4: As described in FIG. 11, when n is an odd number, a total of n number of symbols may be indicated by differentiating a number of Symbol 1's (symbol including Information 1) and a number of Symbol 0's (symbols including Information 0) from one another.

Information 0->n number of symbols configured of an odd number of Symbol 1's and an even number of Symbol 0's, or n number of symbols configured of an even number of Symbol 1's and an odd number of Symbol 0's Information 1->n number of symbols configured of an odd number of Symbol 0's and an even number of Symbol 1's, or n number of symbols configured of an even number of Symbol 0's and an odd number of Symbol 1's Additionally, the order of the symbols may be reconfigured by an interleaver. Herein, the interleaver may be applied in packet units and units of a specific number of symbols.

Moreover, as described above, the receiving device may determine the symbol (or information) as Information 0 or Information 1 by determining the threshold value and comparing the power levels of n number of symbols.

However, if consecutive Symbol 0's (or OFF-signals) are used, a problem of coexistence with the legacy Wi-Fi device and/or another device may occur. The problem of coexistence refers to a problem that occurs when another device transmits a signal after determining that the channel is in a channel idle state, due to the existence of consecutive OFF-symbols. Therefore, in order to resolve the problem of coexistence, since it is preferable to avoid the usage of consecutive OFF-signals, the method proposed in Option 2 may be preferred.

Additionally, this may be extended to a method of expressing m number of information sets by using n number of symbols. In this case, the first or last m number of information sets may be indicated as symbols 0 (OFF) or 1 (ON) in accordance with the corresponding information sets, and n-m number of redundant symbols 0 (OFF) or 1 (ON) may be consecutively configured after or before the first or last m number of information sets.

For example, if a code rate of 3/4 is applied to information 010, the information may be 1,010 or 010,1 or 0,010 or 010,0. However, in order to prevent the usage of consecutive OFF symbols, it may be preferable to apply a code rate of 1/2 or less.

Similarly, in this exemplary embodiment, the order of the symbols may be reconfigured by an interleaver. Herein, the interleaver may be applied in packet units and units of a specific number of symbols.

Hereinafter, various exemplary embodiments of a symbol having the symbol repetition method applied thereto will be described in detail.

Generally, a symbol having the symbol repetition method applied thereto may be indicated as n number of (CP+3.2 us) or CP+n number of (1.6 us).

As shown in FIG. 11, 1 bit is indicated by using n (n>=2) number of information signals (symbols), and, after applying a specific sequence to all of the subcarriers that are available for usage (e.g., 13 subcarriers), IFFT is performed so as to configure an information signal (symbol) of 3.2 us.

Different sequences may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part having a specific length at an end part of the information signal 3.2 us that immediately follows the CP. At this point, the CP may be 0.4 us or 0.8 us. This length is the same length as the guard interval of 802.11ac.

Therefore, a 1-bit information corresponding to a general symbol having the symbol repetition method applied thereto may be indicated as shown below in the following table.

TABLE 4

| Information '0' | Information '1' |
|---|---|
| All 3.2 us OFF-signals or two specific consecutive signals are 3.2 us ON-signal + 3.2 us OFF-signal, and the remaining signals are all ON or all OFF or two specific consecutive signals are 3.2 us OFF-signal + 3.2 us ON-signal, and the remaining signals are all ON or all OFF or a specific number (or ceil(n/2) number or floor(n/2) number) of signals located at specific positions are 3.2 us OFF-signals, and the remaining signals are 3.2 us ON-signals Ex) ON + OFF + ON + OFF . . . | All 3.2 us ON-signals or two specific consecutive signals are 3.2 us OFF-signal + 3.2 us ON-signal, and the remaining signals are all ON or all OFF or two specific consecutive signals are 3.2 us ON-signal + 3.2 us OFF-signal, and the remaining signals are all ON or all OFF or a specific number (or ceil(n/2) number or floor(n/2) number) of signals located at specific positions are 3.2 us ON-signals, and the remaining signals are 3.2 us OFF-signals Ex) OFF + ON + OFF + ON + OFF . . . |

Table 4 does not separately indicate the CP. Actually, when including the CP, n number of (CP+3.2 us) or CP+n number of (3.2 us) may indicate one 1-bit information. More specifically, in case of the n number of (CP+3.2 us), the 3.2 us ON-signal may be regarded as a (CP+3.2 us) ON-signal, and the 3.2 us OFF-signal may be regarded as a (CP+3.2 us) OFF-signal.

As another example, a symbol having the symbol repetition method applied thereto may be indicated as CP+3.2 us+CP+3.2 us or CP+3.2 us+3.2 us.

According to this exemplary embodiment, 1 bit is indicated by using two information signals (symbols), and, after applying a specific sequence to all of the subcarriers that are available for usage (e.g., 13 subcarriers), IFFT is performed so as to configure an information signal (symbol) of 3.2 us.

Different sequences may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part having a specific length at an end part of the information signal 3.2 us that immediately follows the CP. At this point, the CP may be 0.4 us or 0.8 us. This length is the same length as the guard interval of 802.11ac.

Therefore, a 1-bit information corresponding to a symbol having the symbol repetition method applied thereto may be indicated as shown below in the following table.

TABLE 5

| Information '0' | Information '1' |
|---|---|
| 3.2 us OFF-signal + 3.2 us OFF-signal or 3.2 us ON-signal + 3.2 us OFF-signal or 3.2 us OFF-signal + 3.2 us ON-signal | 3.2 us ON-signal + 3.2 us ON-signal or 3.2 us ON-signal + 3.2 us ON-signal or 3.2 us ON-signal + 3.2 us OFF-signal |

Table 5 does not separately indicate the CP. Actually, when including the CP, CP+3.2 us+CP+3.2 us or CP+3.2 us+3.2 us may indicate one 1-bit information. More specifically, in case of CP+3.2 us+CP+3.2 us, the 3.2 us ON-signal may be regarded as a (CP+3.2 us) ON-signal, and the 3.2 us OFF-signal may be regarded as a (CP+3.2 us) OFF-signal.

As yet another example, a symbol having the symbol repetition method applied thereto may be indicated as CP+3.2 us+CP+3.2 us+CP+3.2 us or CP+3.2 us+3.2 us+3.2 us.

According to this exemplary embodiment, 1 bit is indicated by using three information signals (symbols), and, after applying a specific sequence to all of the subcarriers that are available for usage (e.g., 13 subcarriers), IFFT is performed so as to configure an information signal (symbol) of 3.2 us.

Different sequences may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part having a specific length at an end part of the information signal 3.2 us that immediately follows the CP. At this point, the CP may be 0.4 us or 0.8 us. This length is to the same length as the guard interval of 802.11ac.

Therefore, a 1-bit information corresponding to a symbol having the symbol repetition method applied thereto may be indicated as shown below in the following table.

TABLE 6

| Information '0' | Information '1' |
|---|---|
| 3.2 us OFF-signal + 3.2 us OFF-signal + 3.2 us OFF-signal or 3.2 us ON-signal + 3.2 us ON-signal + 3.2 us OFF-signal or 3.2 us ON-signal + 3.2 us OFF-signal + 3.2 us ON-signal or 3.2 us ON-signal + 3.2 us OFF-signal + 3.2 us ON-signal | 3.2 us ON-signal + 3.2 us ON-signal + 3.2 us ON-signal or 3.2 us ON-signal + 3.2 us ON-signal + 3.2 us ON-signal or 3.2 us ON-signal + 3.2 us ON-signal + 3.2 us OFF-signal + 3.2 us ON-signal or 3.2 us OFF-signal + 3.2 us ON-signal + 3.2 us OFF-signal |

Table 6 does not separately indicate the CP. Actually, when including the CP, CP+3.2 us+CP+3.2 us+CP+3.2 us or CP+3.2 us+3.2 us+3.2 us may indicate one 1-bit information. More specifically, in case of CP+3.2 us+CP+3.2 us+CP+3.2 us, the 3.2 us ON-signal may be regarded as a (CP+3.2 us) ON-signal, and the 3.2 us OFF-signal may be regarded as a (CP+3.2 us) OFF-signal.

As yet another example, a symbol having the symbol repetition method applied thereto may be indicated as CP+3 0.2 us+CP+3 0.2 us+CP+3 0.2 us+CP+3 0.2 us or CP+3 0.2 us+3 0.2 us+3 0.2 us+3 0.2 us.

According to this exemplary embodiment, 1 bit is indicated by using four information signals (symbols), and, after applying a specific sequence to all of the subcarriers that are available for usage (e.g., 13 subcarriers), IFFT is performed so as to configure an information signal (symbol) of 3.2 us.

Different sequences may be applied to the subcarriers that are available for usage in accordance with a 3.2 us ON-signal and a 3.2 us OFF-signal. The 3.2 us OFF-signal may be generated by applying 0s to all of the coefficients.

The CP may select and use a part having a specific length at an end part of the information signal 3.2 us that immediately follows the CP. At this point, the CP may be 0.4 us or 0.8 us. This length is the same length as the guard interval of 802.11ac.

Therefore, a 1-bit information corresponding to a symbol having the symbol repetition method applied thereto may be indicated as shown below in the following table.

TABLE 7

| Information '0' | Information '1' |
|---|---|
| 3.2 us OFF-signal + 3.2 us OFF-signal + 3.2 us OFF-signal + 3.2 us OFF-signal or 3.2 us ON-signal + 3.2 us ON-signal + 3.2 us ON-signal + 3.2 us OFF-signal or 3.2 us ON-signal + 3.2 us ON-signal + 3.2 us OFF-signal + 3.2 us ON-signal or 3.2 us ON-signal + 3.2 us ON-signal + 3.2 us OFF-signal + 3.2 us ON-signal or 3.2 us ON-signal + 3.2 us OFF-signal + 3.2 us ON-signal + 3.2 us ON-signal or 3.2 us ON-signal + 3.2 us OFF-signal + 3.2 us ON-signal + 3.2 us OFF-signal or 3.2 us ON-signal + 3.2 us OFF-signal + 3.2 us ON-signal + 3.2 us OFF-signal + 3.2 us OFF-signal or 3.2 us OFF-signal + 3.2 us OFF-signal + 3.2 usON-signal + 3.2 us ON-signal | 3.2 us ON-signal + 3.2 us ON-signal + 3.2 us ON-signal + 3.2 us ON-signal or 3.2 us ON-signal + 3.2 us ON-signal + 3.2 us OFF-signal + 3.2 us ON-signal or 3.2 us ON-signal + 3.2 us ON-signal + 3.2 us ON-signal + 3.2 us ON-signal or 3.2 us ON-signal + 3.2 us OFF-signal or 3.2 us ON-signal + 3.2 us ON-signal + 3.2 us OFF-signal + 3.2 us ON-signal + 3.2 us ON-signal or 3.2 us ON-signal + 3.2 us ON-signal + 3.2 us OFF-signal + 3.2 us ON-signal or 3.2 us OFF-signal + 3.2 us ON-signal + 3.2 us OFF-signal + 3.2 us ON-signal or 3.2 us OFF-signal + 3.2 us OFF-signal + 3.2 us OFF-signal + 3.2 us ON-signal or 3.2 us ON-signal + 3.2 us ON-signal + 3.2 us OFF-signal + 3.2 us OFF-signal |

Table 7 does not separately indicate the CP. Actually, when including the CP, CP+3 0.2 us+CP+3 0.2 us+CP+3 0.2 us+CP+3 0.2 us or CP+3 0.2 us+3 0.2 us+3 0.2 us+3 0.2 us may indicate one 1-bit information. More specifically, in case of CP+3.2 us+CP+3.2 us+CP+3.2 us+CP+3.2 us, the 3.2 us ON-signal may be regarded as a (CP+3.2 us) ON-signal, and the 3.2 us OFF-signal may be regarded as a (CP+3.2 us) OFF-signal.

As yet another example, a symbol having Manchester coding applied thereto may be indicated as n number of (CP+1.6 us+CP+1.6 us) or CP+n number of (1.6 us+1.6 us).

According to this exemplary embodiment, 1 bit is indicated by a symbol that is repeated n (n>=2) number of times, and, after applying a specific sequence to all of the subcarriers that are available for usage (e.g., 13 subcarriers) and setting a coefficient of 0 for the remaining subcarriers, IFFT is performed so as to generate a signal (symbol) of 3.2 us having a cycle of 1.6 us. Herein, one of the configured signals is selected and set (or configured) as a 1.6 us information signal (symbol).

A sub-information may be referred to as a 1.6 us information signal. The 1.6 us information signal may be a 1.6 us ON-signal or a 1.6 us OFF-signal. The 1.6 us ON-signal and the 1.6 us OFF-signal may have different sequences applied thereto in each subcarrier. The 1.6 us OFF-signal may be generated by applying 0s to all of the coefficients.

The CP may select and use a part having a specific length at an end part of the information signal 1.6 us that immediately follows the CP. At this point, the CP may be 0.4 us or 0.8 us. This length is the same length as the guard interval of 802.11ac.

Therefore, a 1-bit information corresponding to a symbol having Manchester coding applied thereto based on symbol repetition may be indicated as shown below in the following table.

TABLE 8

| Information '0' | Information '1' |
|---|---|
| (1.6 us ON-signal + 1.6 us OFF-signal) is repeated n number of times or (1.6 us OFF-signal + 1.6 us ON-signal) is repeated n number of times | (1.6 us OFF-signal + 1.6 us ON-signal) is repeated n number of times or (1.6 us ON-signal + 1.6 us OFF-signal) is repeated n number of times |
| (1.6 us ON-signal + 1.6 us OFF-signal) + (1.6 us OFF-signal + 1.6 us ON-signal) is repeated floor(n/2) number of times + (1.6 us ON-signal + 1.6 us OFF-signal) when needed | (1.6 us OFF-signal + 1.6 us ON-signal) + (1.6 us ON-signal + 1.6 us OFF-signal) is repeated floor(n/2) number of times + (1.6 us OFF-signal + 1.6 us ON-signal) when needed |
| (1.6 us OFF-signal + 1.6 us ON-signal) + (1.6 us ON-signal + 1.6 us OFF-signal) is repeated floor(n/2) number of times + (1.6 us OFF-signal + 1.6 us ON-signal) when needed | (1.6 us ON-signal + 1.6 us OFF-signal) + (1.6 us OFF-signal + 1.6 us ON-signal) is repeated floor(n/2) number of times + (1.6 us ON-signal + 1.6 us OFF-signal) when needed |

Table 8 does not separately indicate the CP. Actually, when including the CP, n number of (CP+1.6 us+CP+1.6 us) or CP+n number of (1.6 us+1.6 us) may indicate one 1-bit information. More specifically, in case of the n number of (CP+1.6 us+CP+1.6 us), the 1.6 us ON-signal may be regarded as a (CP+1.6 us) ON-signal, and the 1.6 us OFF-signal may be regarded as a (CP+1.6 us) OFF-signal.

As shown in the above-described exemplary embodiments, by using the symbol repetition method, the range requirement of the low-power wake-up communication may be satisfied. In case of applying only the OOK scheme, the data rate for one symbol is 250 Kbps (4 us). At this point, if the symbol is repeated 2 times by using the symbol repetition method, the data rate may become 125 Kbps (8 us), and, if the symbol is repeated 4 times, the data rate may become 62.5 Kbps (16 us), and, if the symbol is repeated 8 times, the data rate may become 31.25 Kbps (32 us). In case of the low-power communication, if the BCC does not exist, the symbol should be repeated 8 times in order to satisfy the range requirement.

Hereinafter, various embodiments of a symbol subjected/applied to a symbol reduction scheme among symbol types that can be used for a WUR will be described.

Figure 12:
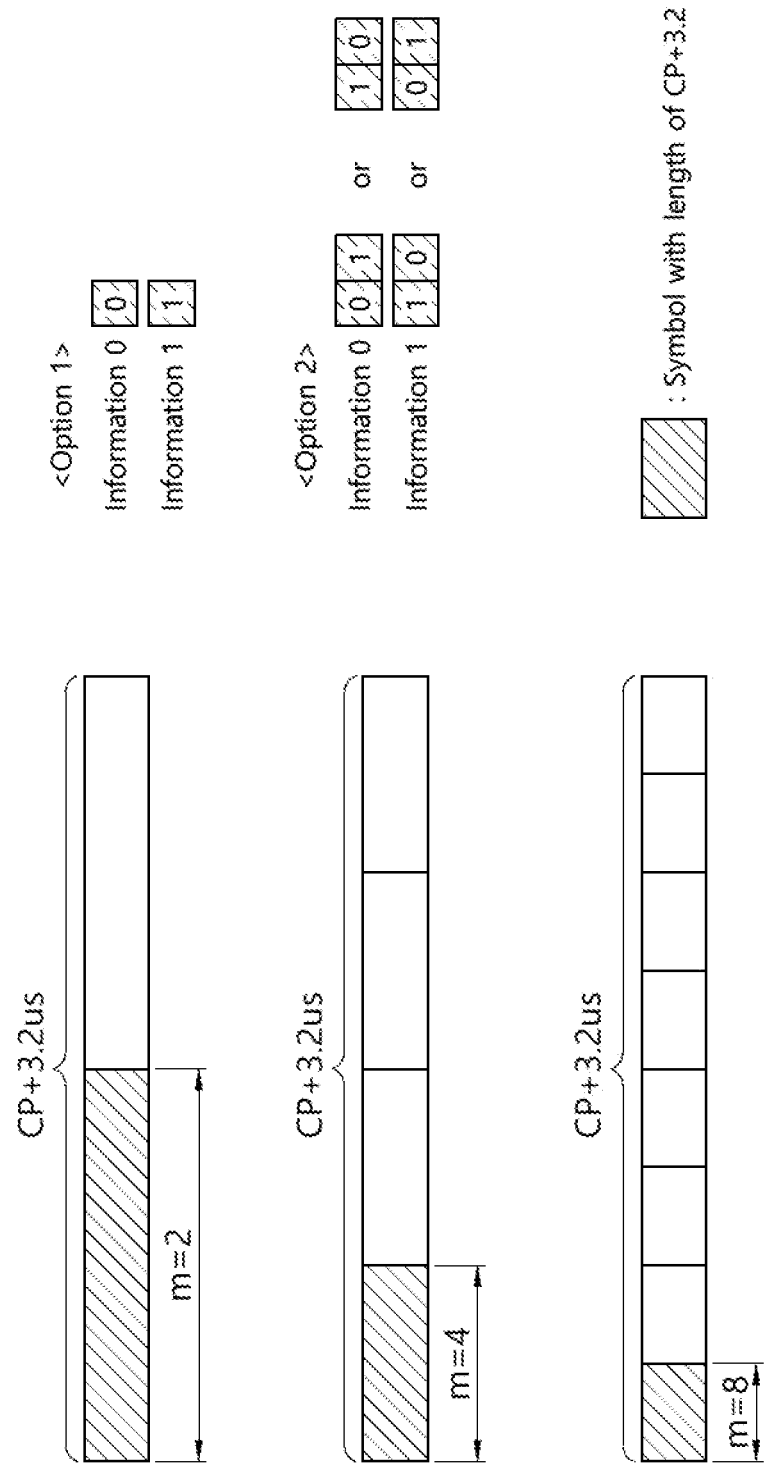
FIG. 12 shows various examples of a symbol reduction scheme according to an embodiment.

FIG. 12 shows various examples of a symbol reduction scheme according to an embodiment.

According to the embodiment of FIG. 12, as m increases, a symbol is reduced, and accordingly the length of a symbol carrying one piece of information is reduced. When m=2, the length of a symbol carrying one piece of information is CP+1.6 us. When m=4, the length of a symbol carrying one piece of information is CP+0.8 us. When m=8, the length of a symbol carrying one piece of information is CP+0.4 us.

The shorter a symbol length is, a higher data rate may be obtained. When only OOK is applied, a data rate for one symbol is 250 Kbps (4 us). In a case where a symbol reduction scheme is applied: when m=2, the data rate may be 500 Kbps (2 us); when m=4, the data rate may be 1 Mbps (1 us); when m=8, the data rate may be 2 Mbps (0.5 us).

For example, a symbol to which a symbol reduction scheme is applied may be represented as CP+3.2 us/m (m=2, 4, 8, 16, 32, . . . ) (Option 1).

As in Option 1 of FIG. 12, one bit is represented using a symbol to which a symbol reduction scheme is applied, a particular sequence is applied to all available subcarriers (for example, 13 subcarriers) by a unit of m subcarriers, and a coefficient of 0 is set for the remaining subcarriers. Then, IFFT is performed on the subcarriers to which the particular sequence is applied, thereby generating 3.2 us signals having a period of 3.2 us/m, one of which is mapped to a 3.2 us/m information signal (information 1).

For example, when a particular sequence is applied to 13 subcarriers by a unit of two subcarriers (m=2), an on signal may be configured as follows.

On signal (information 1); {a b c 0 d 0 e 0 f 0 g} or {0 a 0 b 0 c 0 d 0 e 0 f 0}, where a, b, c, d, e, f, and g are 1 or −1.

In another example, when a particular sequence is applied to 13 subcarriers by a unit of four subcarriers (m=4), an on signal may be configured as follows.

On signal (information 1): {a 0 0 0 b 0 0 0 c 0 0 0 d}, {0 a0 0 0 b 0 0 0 c 0 0 0}, {0 0 a 0 0 0 b 0 0 0 c 0 0}, {0 0 0 a 0 0 0 b 0 0 0 c 0}, or {0 0 a 0 0 0 0 0 0 0 b 0 0}, where a, b, c, and d are 1 or −1.

In still another example, when a particular sequence is applied to 13 subcarriers by a unit of eight subcarriers (m=8), an on signal may be configured as follows.

On signal (information 1): {a 0 0 0 0 0 0 0 b 0 0 0 0}, {0 a 0 0 0 0 0 0 0 b 0 0 0}, {0 0 a 0 0 0 0 0 0 0 b 0 0}, {0 0 0 a 0 0 0 0 0 0 0 b 0}, or {0 0 0 0 a 0 0 0 0 0 0 0 b}, where a and b is 1 or −1.

A 3.2 us/m information signal is divided into a 3.2 us/m on signal and a 3.2 us/m off signal. Different sequences may be applied to (available) subcarriers for the 3.2 us/m on signal and the 3.2 us/m off signal. The 3.2 us/m off signal may be generated by applying 0 to all coefficients.

A CP may be used by adopting a specified length of the following 3.2 us/m information signal from the back. Here, the CP may be 0.4 us or 0.8 us. This length is the same as the length of a guard interval in 802.11ac. However, when m=8, the CP cannot be 0.8 us. Alternatively, the CP may be 0.1 us or 0.2 us and may be a different value.

Therefore, one-bit information corresponding to a symbol to which a general symbol reduction scheme is applied may be represented as in the following table.

TABLE 9

| Information 0 | Information 1 |
|---|---|
| 3.2 us/m OFF-signal | 3.2 us/m ON-signal |

In Table 9, the CP is not indicated. Actually, CP+3.2 us/m including the CP may indicate one one-bit information. That is, the 3.2 us/m on signal may be considered as a CP+3.2 us/m on signal, and the 3.2 us/m off signal may be considered as a CP+3.2 us/m off signal.

In another example, a symbol to which a symbol reduction scheme is applied may be represented as CP+3.2 us/m+CP+3.2 us/m (m=2, 4, 8) (Option 2).

In OOK transmission using a Wi-Fi transmission device, the time used to transmit one bit (or symbol) excluding a guard interval of a transmission signal is 3.2 us. Here, when a symbol reduction scheme is applied, the time used to transmit one bit is 3.2 us/m. However, in this embodiment, the time used to transmit one bit is set to 3.2 us/m+3.2 us/m by repeating a symbol to which the symbol reduction scheme is applied, and transition in signal size between 3.2 us/m signals is allowed to occur using characteristics of Manchester coding. That is, each piece of sub-information having a length of 3.2 us/m needs to have a value of 0 or 1, and a signal may be configured as follows.

Information 0->1 0 (each may be called sub-information 1 or 0, or sub-symbol 1 (ON) or 0 (OFF))

First 3.2 us/m signal (sub-information 1 or sub-symbol 1): A particular sequence is applied by a unit of m spaces to all subcarriers (for example, 13 subcarriers) available to generate a symbol to which a symbol reduction scheme is applied. That is, the particular sequence may have a coefficient at intervals of m spaces.

The transmission device maps particular sequences to K consecutive subcarriers among 64 subcarriers, sets a coefficient of 0 for the remaining subcarriers, and performs IFFT the subcarriers. Accordingly, a time-domain signal may be generated. Since the time-domain signal has a coefficient at intervals of m spaces in the frequency domain, a 3.2 us signal having a period of 3.2 us/m is generated. One of these signals may be adopted and used as a 3.2 us/m on signal (sub-information 1).

Second 3.2 us/m signal (sub-information 0 or sub-symbol 0): Similarly to the first 3.2 us/m signal, the transmission device may map particular sequences to K consecutive subcarriers among 64 subcarriers and may perform IFFT thereon, thereby generating a time-domain signal. Sub-information 0 may correspond to a 3.2 us/m off signal. The 3.2 us/m off signal may be generated by setting all coefficients to 0.

One of the first and second 3.2 us/m periodic signals of the time-domain signals may be selected and used as sub-information 0.

Information 1->0 1 (each may be called sub-information 0 or 1, or sub-symbol 0 (OFF) or 1 (ON))

Since information 1 is also divided into a first 3.2 us/m signal (sub-information 0) and a second 3.2 us/m signal (sub-information 1), a signal corresponding to each sub-information may be configured in the same manner as used for generating information 0.

Information 0 may be configured as 01, and information 1 may be configured as 10.

As in Option 2 of FIG. 12, one-bit information corresponding to a symbol to which a symbol reduction scheme is applied may be represented as in the following table.

TABLE 10

| Information 0 | Information 1 |
|---|---|
| 3.2 us/m OFF-signal + 3.2 us/m ON-signal or 3.2 us/m ON-signal + 3.2 us/m OFF-signal | 3.2 us/m ON-signal + 3.2 us/m OFF-signal or us/m OFF-signal + 3.2 us/m ON-signal |

In Table 10, the CP is not indicated. Actually, CP+3.2 us/m including the CP may indicate one one-bit information. That is, the 3.2 us/m on signal may be considered as a CP+3.2 us/m on signal, and the 3.2 us/m off signal may be considered as a CP+3.2 us/m off signal.

Embodiments of Option 1 and Option 2 in FIG. 12 may be generalized as in the following table.

TABLE 11

| | Information 0 | Information 1 |
|---|---|---|
| Option 1 (m = 2, 4, 8) | 2 us OFF-signal<br>1 us OFF-signal<br>0.5 us OFF-signal | 2 us ON-signal<br>1 us ON-signal<br>0.5 us ON-signal |
| Option 2 (m = 4, 8) | 1 us OFF-signal + 1 us ON-signal or 1 us ON-signal + 1 us OFF-signal<br>0.5 us OFF-signal + 0.5 us ON-signal or 0.5 us ON-signal + 0.5 us OFF-signal | 1 us ON-signal + 1 us OFF-signal or 1 us OFF-signal + 1 us ON-signal<br>0.5 us ON-signal + 0.5 us OFF-signal or 0.5 us OFF-signal + 0.5 us ON-signal |

In Table 11, each signal is represented by a length including a CP. That is, CP+3.2 us/m including a CP may indicate one one-bit information.

For example, when m=4 in Option 2, since the length of a symbol carrying one piece of information is CP+0.8 us, a 1 us off signal or 1 us on signal includes a CP (0.2 us)+0.8 us signal. In Option 2, since Manchester coding is applied, a symbol is repeated. Thus, when m=4, data rate for one piece of information may be 500 Kbps.

In another example, when m=8 in Option 2, since the length of a symbol carrying one piece of information is CP+0.4 us, a 0.5 us off signal or a 0.5 us on signal includes a CP (0.1 us)+0.4 us signal. In Option 2, since Manchester coding is applied, a symbol is repeated. Thus, when m=8, data rate for one piece of information may be 1 Mbps.

The following table shows data rates that can be obtainable through the foregoing embodiments.

TABLE 12

| CP | Default symbol (Embodiment 1) (CP + 3.2 us) | Man. Symbol (Embodiment 2) (CP + 1.6 + CP + 1.6) | Man. Symbol (Embodiment 3) (CP + 1.6 + 1.6) |
|---|---|---|---|
| 0.4 us | 277.8 | 250.0 | 277.8 |
| 0.8 us | 250.0 | 208.3 | 250.0 |

TABLE 13

| | Symbol rep. n (CP + 3.2 us) | | | Symbol rep. CP + n (3.2 us) | | | Man. symbol rep. n (CP + 1.6 us + CP + 1.6 us) | | |
|---|---|---|---|---|---|---|---|---|---|
| CP | n = 2 (Embodiment 4) | n = 3 (Embodiment 5) | n = 4 (Embodiment 6) | n = 2 (Embodiment 7) | n = 3 (Embodiment 8) | n = 4 (Embodiment 9) | n = 2 (Embodiment 10) | n = 3 (Embodiment 11) | n = 4 (Embodiment 12) |
| 0.4 us | 138.9 | 92.6 | 69.4 | 147.1 | 100.0 | 75.8 | 125.0 | 83.3 | 62.5 |
| 0.8 us | 125.0 | 83.3 | 62.5 | 138.9 | 96.2 | 73.5 | 104.2 | 69.4 | 52.1 |

TABLE 14

| | Man. symbol rep. CP + n (1.6 us + 1.6 us) | | | Symbol reduction CP + 3.2 us/m | | |
|---|---|---|---|---|---|---|
| CP | n = 2 (Embodiment 13) | n = 3 (Embodiment 14) | n = 4 (Embodiment 15) | m = 2 (Embodiment 16) | m = 4 (Embodiment 17) | m = 8 (Embodiment 18) |
| 0.4 us | 147.1 | 100.0 | 75.8 | 500.0 | 833.3 | 1250.0 |
| 0.8 us | 138.9 | 96.2 | 73.5 | 416.7 | 625.0 | NA |

TABLE 15

| | Symbol reduction CP + 3.2 us/m | | Man. symbol rep. w/Man. CP + 3.2 us/m + CP + 3.2 us/m | |
|---|---|---|---|---|
| CP | m = 4 | m = 8 | m = 4 | m = 8 |
| 0.1 us | 1111.1 | 2000 | 555.6 | 1000 |
| 0.2 us | 1000 | 1666.7 | 500 | 833.3 |

Figure 13:
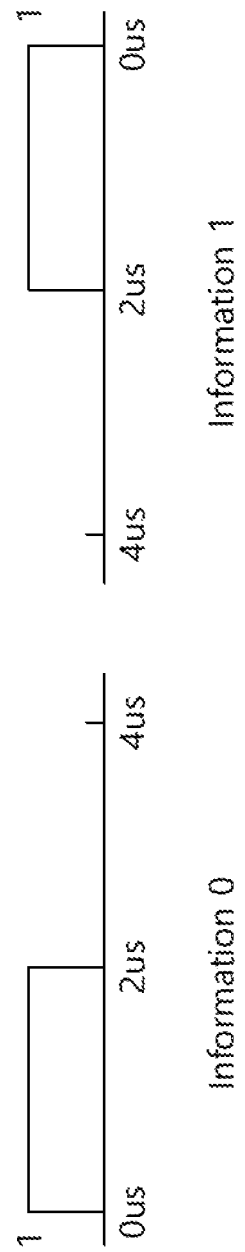
FIG. 13 shows an example of configuring a 2 us-ON signal based on signal masking according to the present embodiment.

FIG. 13 shows an example of configuring a 2 us-ON signal based on signal masking according to the present embodiment.

Data rates may be secured in accordance with various symbol types that may be used in a WUR. At this point, In order to secure a data rate of 250 Kbps, a method for generating a 2 us-ON signal may be proposed. FIG. 13 proposes a masking-based method using a length-13 sequence (wherein coefficients are inserted in all of the 13 consecutive subcarriers within a 20 MHz band).

Referring to FIG. 13, in case of a masking-based access method, a 4 us-OOK symbol may first be generated. 64-point IFFT is performed by applying a length-13 sequence to 13 consecutive subcarriers of a 20 MHz band, and a 0.8 us CP or GI is added so as to generate a 4 us-OOK symbol.

For example, referring to FIG. 13, Information 0 may configure a 2 us-ON signal by acquiring a front half-part of a 4 us symbol. And, since a rear half-part does not transmit any information, this part may configure a 2 us OFF signal. Additionally, Information 1 may configure a 2 us-ON signal by acquiring a rear half-part of a 4 us symbol. And, since a front half-part does not transmit any information, this part may configure a 2 us OFF signal.

Additionally, hereinafter, various data rates may be applied to a payload of a WUR PPDU in an 802.11ba system, and, in order to reduce overhead of the WUR PPDU, the WUR PPDU may be configured by using two different types of sync parts or sync fields having different lengths. The present specification proposes various methods of indicating data rates being applied to a payload by using two types of sync parts or sync fields.

When the WUR PPDU being transmitted for waking up a primary radio transmits WUR signals to multiple STAs by using a wide bandwidth (or multi-channel), the present specification proposes a method for configuring and transmitting a sequence being carried on 13 subcarriers in the aspect of frequency in order to reduce PAPR.

More specifically, when the WUR PPDU being transmitted for waking up a primary radio is transmitted by using a wide bandwidth (e.g., 40 MHz, 80 MHz and 160 MHz), WUR signals are transmitted by using 4 MHz within 20 MHz, and, in the aspect of frequency, a WUR signal is configured by using 13 subcarriers. In case the WUR signal is transmitted by using a wide bandwidth, by performing repeated transmission of the same 13 subcarriers within the bandwidth, the PAPR may be increased. Therefore, the present specification proposes a method for configuring a frequency sequence being carried on 13 subcarriers in order to reduce PAPR, when transmitting a MU WUR PPDU by using a wide bandwidth.

Figure 14:
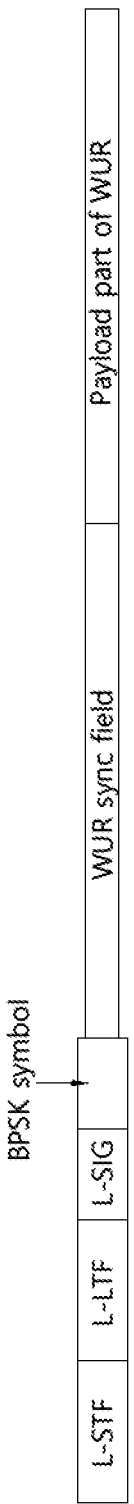
FIG. 14 shows an example of a wake-up packet structure applying a sync part according to the present embodiment.

FIG. 14 shows an example of a wake-up packet structure applying a sync part according to the present embodiment.

FIG. 14 is an example of a WUR PPDU applying a sync part (or sync field) in an IEEE 802.11ba system.

A WUR signal for waking up a primary radio may be transmitted by using a frame format shown in FIG. 14.

As shown in FIG. 14, for coexistence with the legacy, a WUR frame may be configured to have a structure of first transmitting an L-Part in front of a WUR part. Additionally, for example, the WUR part may be configured of a WUR-sync field and a WUR-payload field, as described above, and the WUR-payload includes control information and not data related to the device.

Herein, the L-part is used for a third party device and not for the WUR receiver, and the WUR receiver may not decode the L-part.

As shown in FIG. 14, a preamble of the WUR is configured of a non WUR portion and a WUR sync field, and the preamble may indicate data rate information being used in the payload by using the WUR sync field. And, according to the data rate, the lengths of the WUR sync field are as described below.

WUR sync field length=64 us at a High data rate (250 Kbps)

WUR sync field length=128 us at a Low data rate (62.5 Kbps)

Accordingly, the WUR-payload may also vary in accordance with a frame body size.

Figure 15:
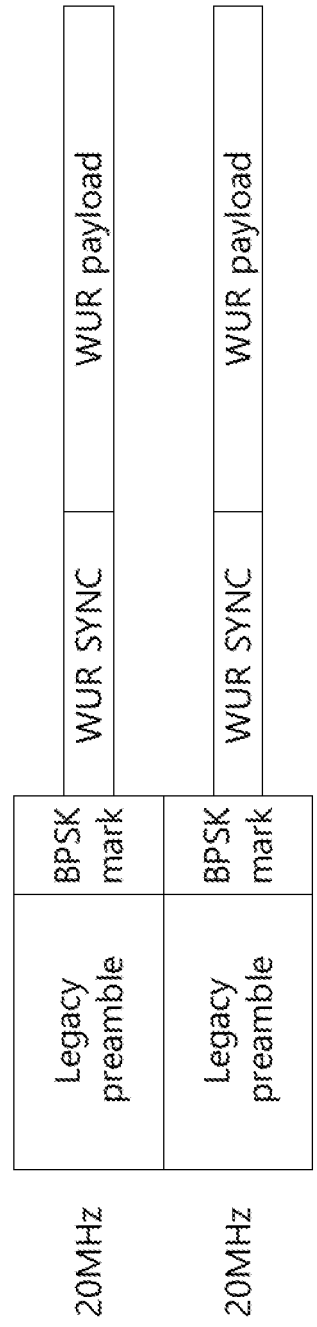
FIG. 15 shows an example of a wake-up packet structure being transmitted through a 40 MHz band according to the present embodiment.
Figure 16:
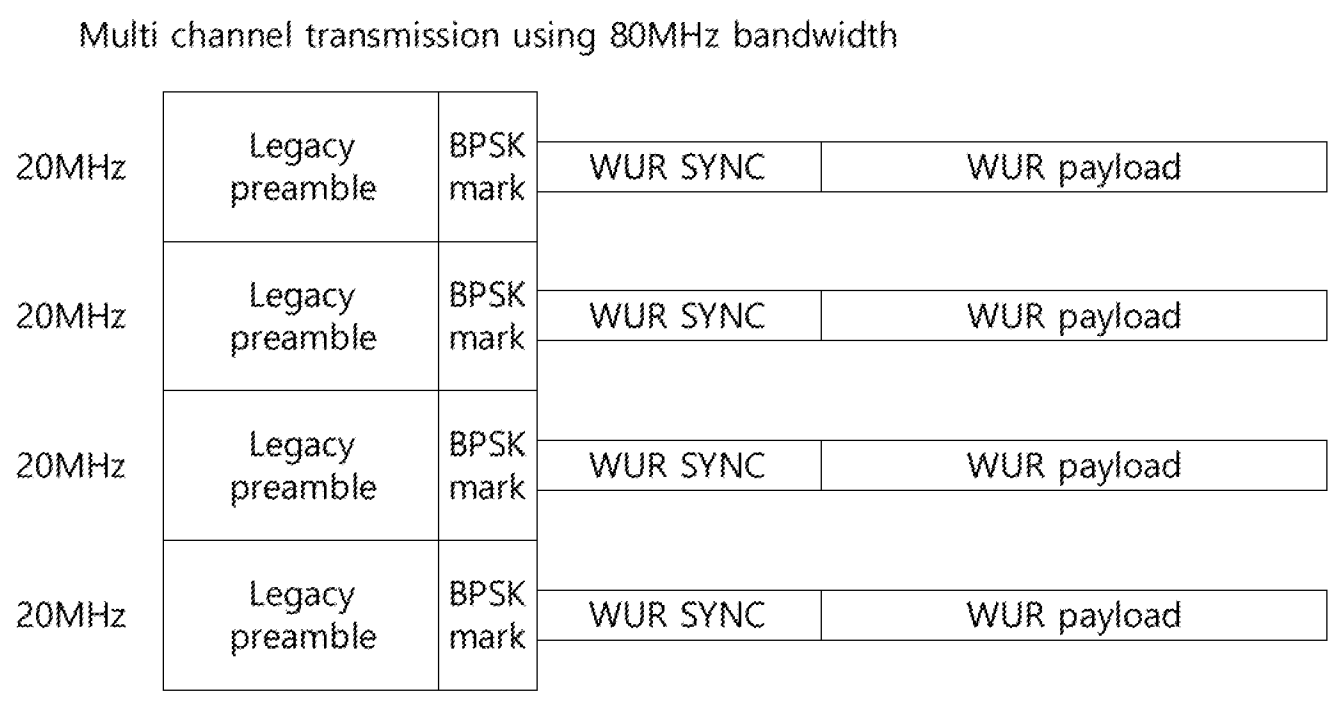

Unlike in FIG. 14, the WUR PPDU may be transmitted by using a wide bandwidth, and, in this case, the WUR PPDU that is transmitted by using the wide bandwidth (e.g., 40 MHz/80 MHz/160 MHz) is transmitted as shown in FIG. 15 to FIG. 17. When the WUR PPDU is transmitted through a wide bandwidth, this indicates that the WUR PPDU is transmitted by having a WUR Frequency Division Multiplexing Access (FDMA) applied thereto.

FIG. 15 shows an example of a wake-up packet structure being transmitted through a 40 MHz band according to the present embodiment.

FIG. 16 shows an example of a wake-up packet structure being transmitted through an 80 MHz band according to the present embodiment.

FIG. 17 shows an example of a wake-up packet structure being transmitted through a 160 MHz band according to the present embodiment.

As shown in FIG. 15 to FIG. 17, in case of transmitting a WUR PPDU by using a wide bandwidth, a Legacy preamble and a BPSK mark, which are the non WUR portion, are duplicated in 20 MHz units and then transmitted. Additionally, a WUR sync field and a WUR payload, which are the WUR portion, are transmitted by using a 4 MHz bandwidth (13 tones or subcarriers) focusing on a center frequency within a 20 MHz channel.

This specification describes problems that may occur during a Wake-Up Radio (WUR) discovery process and proposes a method for resolving such problems. By performing the WUR discovery process, a WUR Access Point may periodically transmit a WUR discovery frame that can also be received by non-associated WUR STAB. Additionally, before performing the WUR discovery process, by providing information on an AP existing near a Primary Connectivity Radio (PCR), i.e., information on a WUR discovery operating class, a WUR discovery channel, a Neighbor AP list, and so on, the AP may perform the WUR discovery process more easily.

By receiving the WUR discovery frame, since the WUR STA may know the BSSID or SSID and the operating channel of the AP before performing a scanning process to the PCR, power and time being consumed during the scanning process may be reduced.

In the present specification, when performing such series of process steps of the WUR discovery process, by notifying a WUR discovery period in addition to the channel information of an adjacent (or neighboring) WUR AP, information on how long a WUR STA is required to perform reception from a WUR discovery channel of each AP is indicated. Thus, the power and time being consumed during the discovery channel may be further reduced.

1. Proposed Embodiment 1-1. Summary

Standardization of a technique for performing a function of waking up a main radio by using a simple wakeup radio is in process. Since power consumption of a WiFi station can be reduced by this technique, attention is rising on the standardization procedure of this technique. The Wake Up Radio (WUR) operates based on a 802.11 family, which is the conventional WiFi standard.

Figure 18:
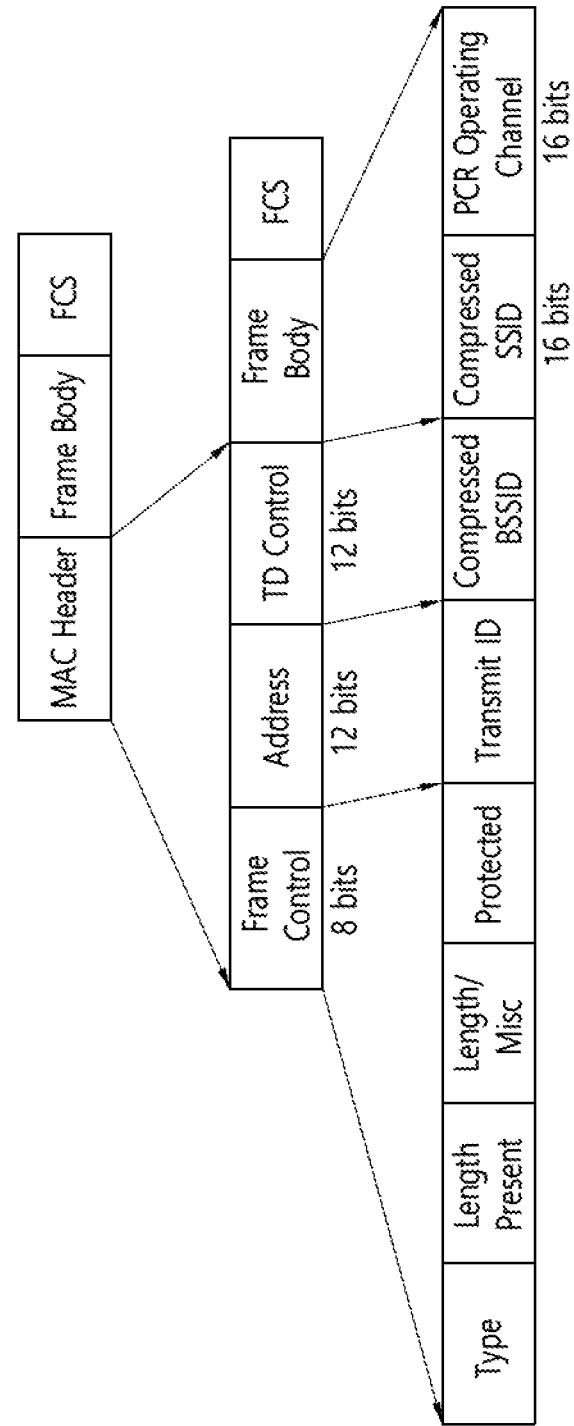
FIG. 18 shows an example of a WUR discovery frame format according to the present embodiment.

FIG. 18 shows an example of a WUR discovery frame format according to the present embodiment.

Meanwhile, discussions are also being made on the issue of using the WUR not only for the purpose of simply achieving power saving but also for enhancing the conventional WLAN features. When using a WUR discovery frame, which is defined in 802.11ba, functions such as roaming scan in an extended service set (ESS) environment, such as in communication service provider WiFi, or public WiFi in airports or subways, may be performed at a low power. In order to transmit a WUR discovery frame, the AP may use the structure shown in FIG. 18.

FIG. 19 shows an example of a WUR Operation element format according to the present embodiment.

Additionally, the AP needs to inform the STA of information on a channel to which the WUR discovery channel is defined. This process is configured of the following WUR Operation element. FIG. 19 shows a structure of the WUR Operation element. A channel in which the discovery process of the corresponding WUR AP is carried out may be notified to the STA through a WUR Discovery Operating Class field and a WUR Discovery Channel field.

FIG. 20 shows an example of a WUR Neighbor AP element format according to the present embodiment.

In addition to its WUR discovery information, the AP may also notify information on a neighbor WUR AP and Neighbor WUR discovery information through the PCR. FIG. 20 shows a structure of a WUR Neighbor AP element for the above-described process. By using the information existing in the Neighbor AP Information field, the STA may know the information not only on its associated AP but also on other adjacent APs. And, afterwards, when a discovery process is performed with the other adjacent APs, due to relocation of the STA, and so on, the information on the AP may be known only through WUR discovery.

FIG. 21 shows an example of a Neighbor AP Information subfield according to the present embodiment.

The Neighbor AP Information in the format of FIG. 20 is indicated as shown in FIG. 21. A WUR discovery channel existing in the surrounding (or adjacent) areas may be know through a WUR Discovery Operating Class field and a WUR Discovery Channel field. A number of neighbour APs using the corresponding WUR discovery channel may be known through a Neighbor AP Count field, and information on a neighbour AP may be known through a Neighbor AP List field.

Figure 22:
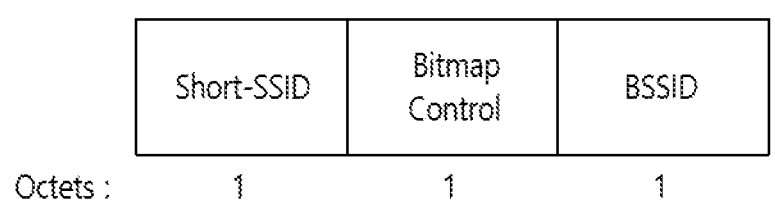
FIG. 22 shows an example of a Neighbor AP List subfield according to the present embodiment.

FIG. 22 shows an example of a Neighbor AP List subfield according to the present embodiment.

The Neighbor AP List subfield in the format of FIG. 21 is indicated as shown in FIG. 22. Information on the SSID and SDDIC of an adjacent AP may be known through the following field.

Figure 23:
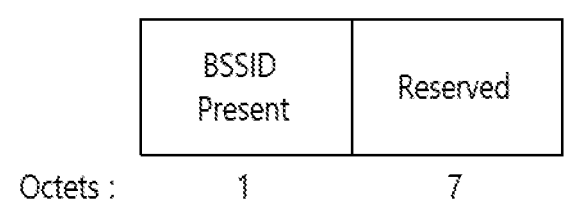
FIG. 23 shows an example of a Bitmap Control Subfield according to the present embodiment.

FIG. 23 shows an example of a Bitmap Control Subfield according to the present embodiment.

The Bitmap Control Subfield in the format of FIG. 22 is indicated as shown in FIG. 23.

When using the above-described method, while a specific STA establishes association with an AP, since WUR discovery information on the adjacent APs and BSSID or SSID, and so on, of the adjacent APs can be known, in case the STA is relocated or restarted, a wanted (or preferred) AP may be found and the WUR discovery process may be performed.

However, since the STA is incapable of knowing a cycle period according to which an adjacent AP transmits the WUR discovery frame, there may occur a problem where the STA waits for a long period of time in order to receive the WUR discovery frame. The present specification proposes a method for resolving the above-described problem.

1-2. Detailed Description of the Method

1) Application of MaxChannelTime

Since the above-described problem of an extended period of time consumption for receiving a frame has already been a problem in the conventional 802.11 baseline environment, this problem has been resolve by using an internal parameter, which is referred to as a MaxChannelTime. In case the STA perform passive scanning, the STA cannot scan each channel for more than the MaxChannelTime. And, this parameter is equally used in the WUR discovery process.

Figure 24:
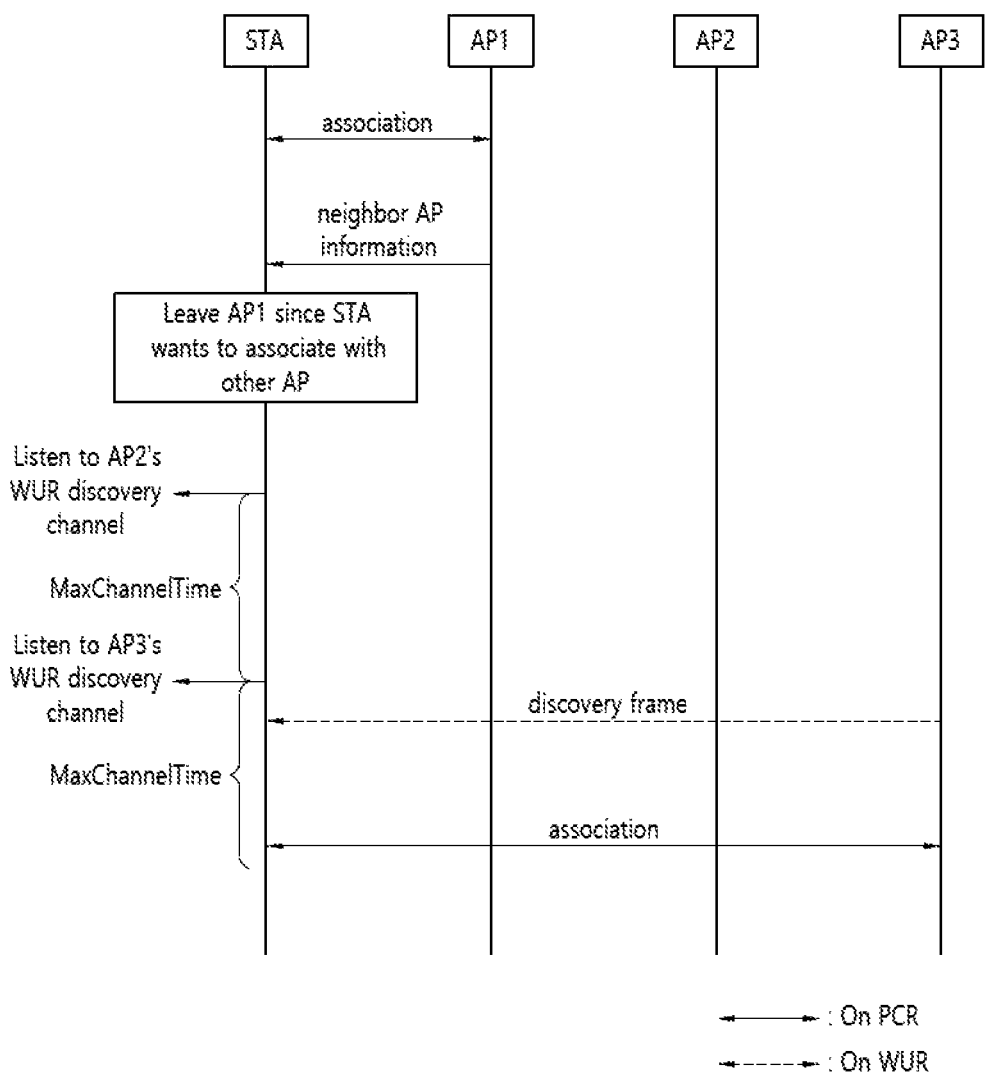
FIG. 24 shows an example of a WUR discovery procedure using MaxChannelTime according to the present embodiment.

FIG. 24 shows an example of a WUR discovery procedure using MaxChannelTime according to the present embodiment.

FIG. 24 is an embodiment of a case using this method. In case the STA obtains information on an adjacent AP from AP1, the STA intends to establish association with another AP and receive a WUR discovery frame of the other AP. The STA alternately performs scanning on each WUR discovery channel for as long as a pre-determined MaxChannelTime and then performs an association process with a wanted AP.

If the MaxChannelTime is set to a long period of time, the likelihood of receiving a WUR discovery frame may be increased. However, this may lead to an extended waiting time since the STA needs to wait for a longer period of time. Conversely, if the MaxChannelTime is set to a short period of time, the waiting time may be reduced. However, since the waiting time may become longer due to an excessively frequent change in discovery channels, adequate parameter setting is required. Additionally, since a parameter being using during the PCR scanning process is shared, the parameter settings may influence the PCR scanning process.

2) Application of WURMaxChannelTime

Figure 25:
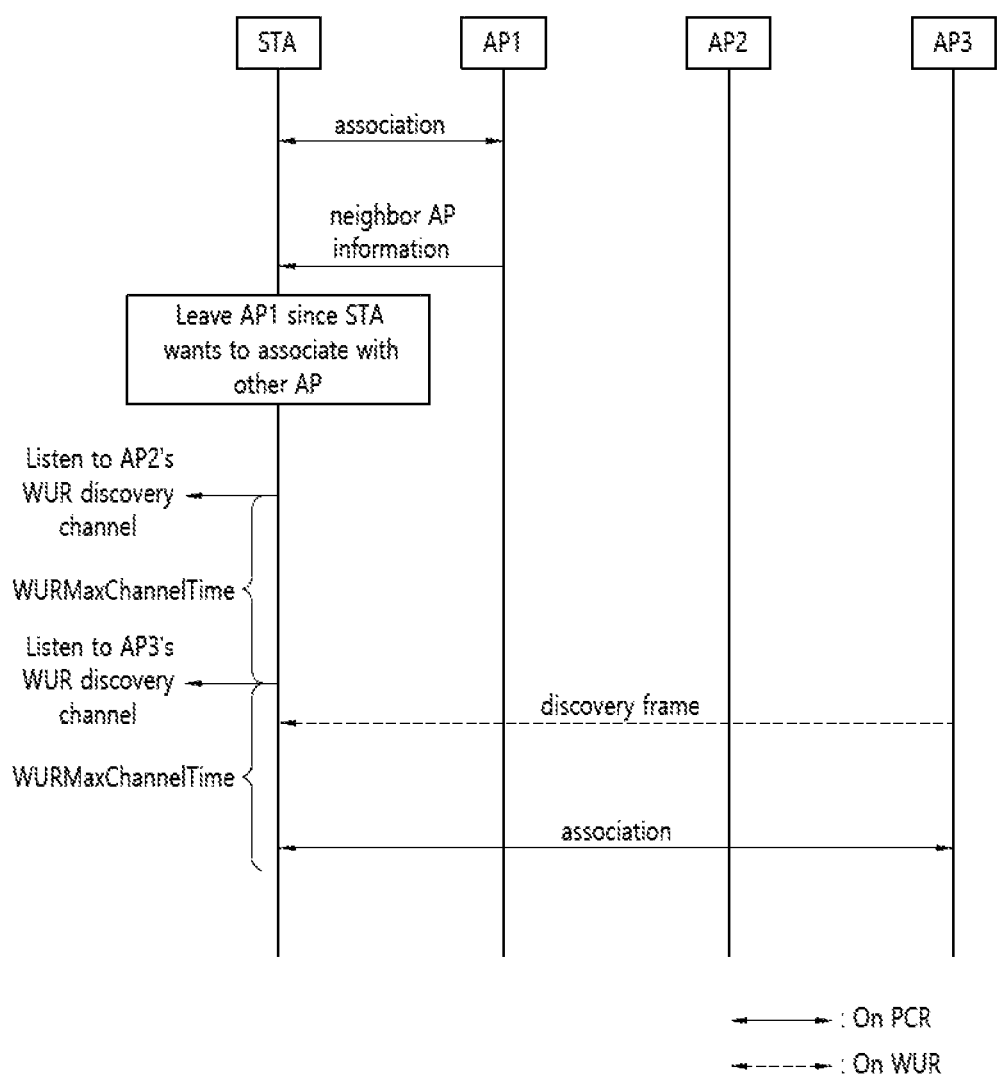
FIG. 25 shows an example of a WUR discovery procedure using WURMaxChannelTime according to the present embodiment.

FIG. 25 shows an example of a WUR discovery procedure using WURMaxChannelTime according to the present embodiment.

Separate parameters being used only for WUR discovery may be used herein. The operating process is the same as 1) Application of MaxChannelTime, and only the parameter settings are varied. When using dedicated parameters, WUR discovery Max channel time may be managed separately from PCT scanning. FIG. 25 is an embodiment using the WURMaxChannelTime.

3) WUR Discovery Period Announcement

Each of the adjacent APs may transmit a WUR discovery frame through a different WUR discovery period. Alternatively, there may also occur a case where the WUR discovery is not performed for a predetermined period of time. In such case, by notifying the information on a neighbour AP and the WUR discovery period of the corresponding AP together at the same time, information on how long the STA shall perform listening in each WUR discovery channel may also be notified.

FIG. 26 shows an example of a Neighbor AP Information subfield format proposed in the present embodiment.

Referring to FIG. 26, a WUR Discovery Period subfield includes information on a discovery period of the corresponding WUR discovery channel. In case only one AP exists in the corresponding channel, the WUR discovery period of the corresponding AP may be included, and, in case one or more APs exist in the corresponding channel, information on a shorter period may be provided.

FIG. 27 shows an example of a Neighbor AP List subfield format proposed in the present embodiment.

Additionally, WUR discovery period information may be provided per neighbour AP. FIG. 27 shows an example of a proposed Neighbor AP List subfield. In this case, since period information of each AP can be provided and not per WUR discovery channel, the STA may perform the WUR discovery process based on this information.

Figure 28:
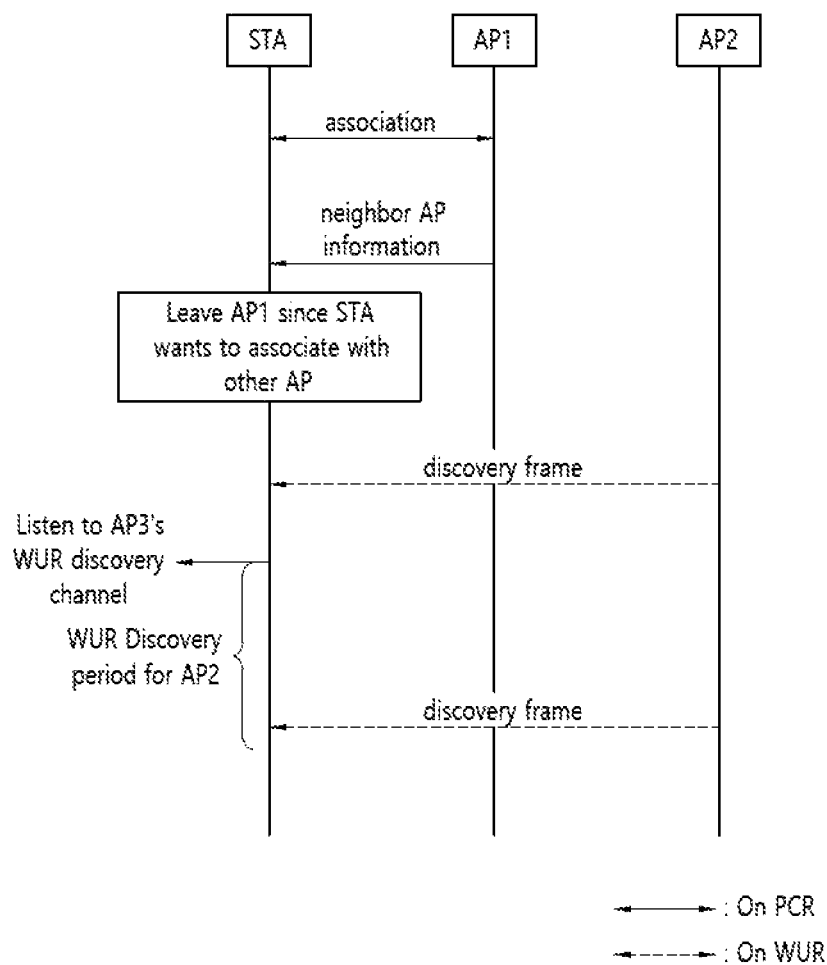
FIG. 28 shows an example of a WUR discovery procedure using a WUR discovery period.

FIG. 28 shows an example of a WUR discovery procedure using a WUR discovery period.

When the WUR discovery period of each neighbour AP is known, FIG. 28 shows an embodiment of performing the WUR discovery process with a specific AP. Since the STA knows the WUR discovery period of AP2 from AP1, the STA may immediately receive the WUR discovery frame by listening the channel for the corresponding period of time or calculated period of time.

Figure 29:
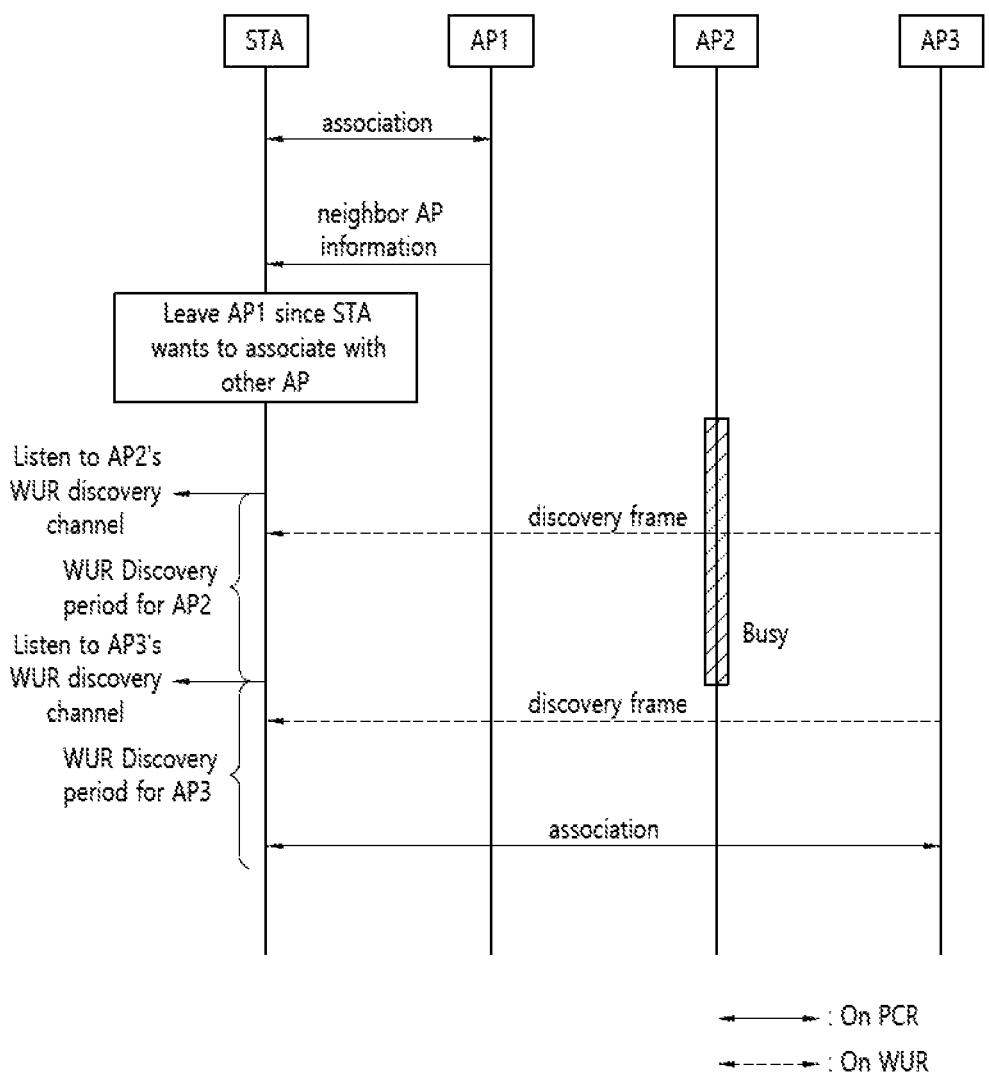
FIG. 29 shows another example of a WUR discovery procedure using a WUR discovery period.

FIG. 29 shows another example of a WUR discovery procedure using a WUR discovery period.

In case the STA wishes to establish association with another AP as soon as possible rather than establishing association with a specific AP, this case may be represented as shown in FIG. 29. Although the STA may know that AP2 is not transmitting WUR discovery, the STA may reduce the time consumed for listening by listening to the current channel during a WUR discovery period that is already known and then by immediately listening to another WUR discovery channel.

The AP may obtain WUR discovery period information of an adjacent AP through a PCR Beacon frame or PCR Probe response frame, and, then, the AP may broadcast such obtained information through a WUR Neighbor AP element by performing the above-described process. And, the STAs receiving the broadcasted information may perform the WUR discovery process.

FIG. 30 shows an example of a WUR operation element format proposed in the present embodiment.

Additionally, when the STA performs direct reception, the STA that has performed reception may efficiently perform WUR discovery by performing listening for as long as a discovery period, which is known while performing the WUR discovery process. The proposed WUR operation element is shown in FIG. 30.

Figure 31:
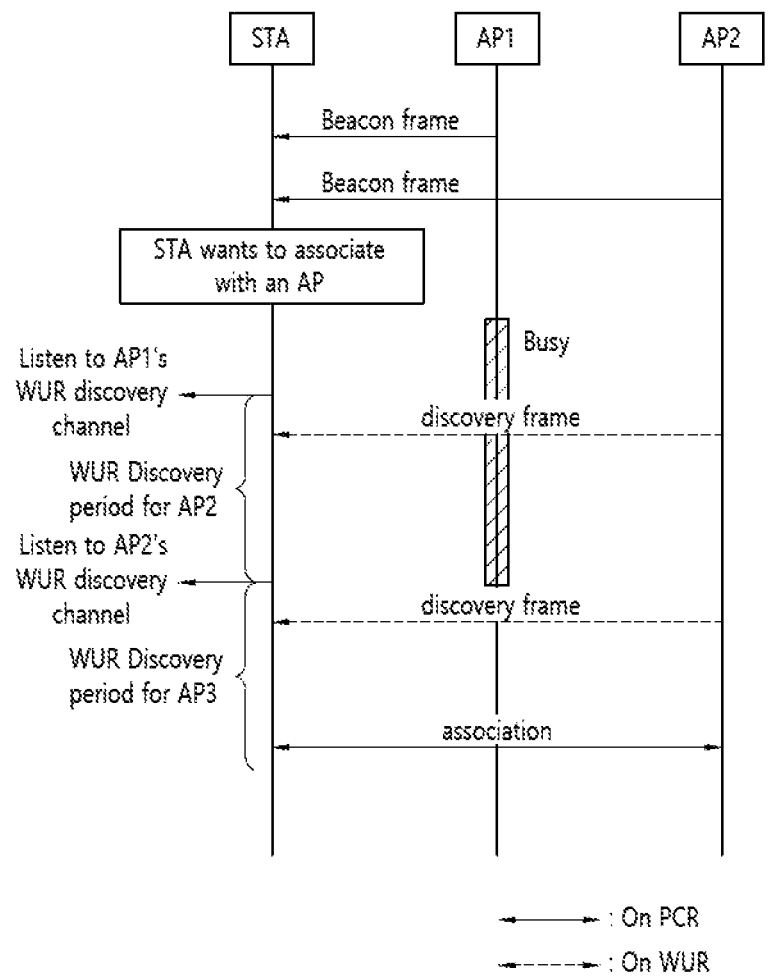
FIG. 31 shows an example of a WUR discovery procedure using a WUR discovery period that is included in a PCR Beacon frame.

FIG. 31 shows an example of a WUR discovery procedure using a WUR discovery period that is included in a PCR Beacon frame.

FIG. 31 shows an embodiment of an STA, which has received a WUR operation element through a PCR Beacon frame, establishing association with APs based on the received information. The STA having received a beacon frame from multiple APs may know the discovery period of the corresponding AP, and the STA may use this information when performing a discovery process with a particular AP.

Figure 32:
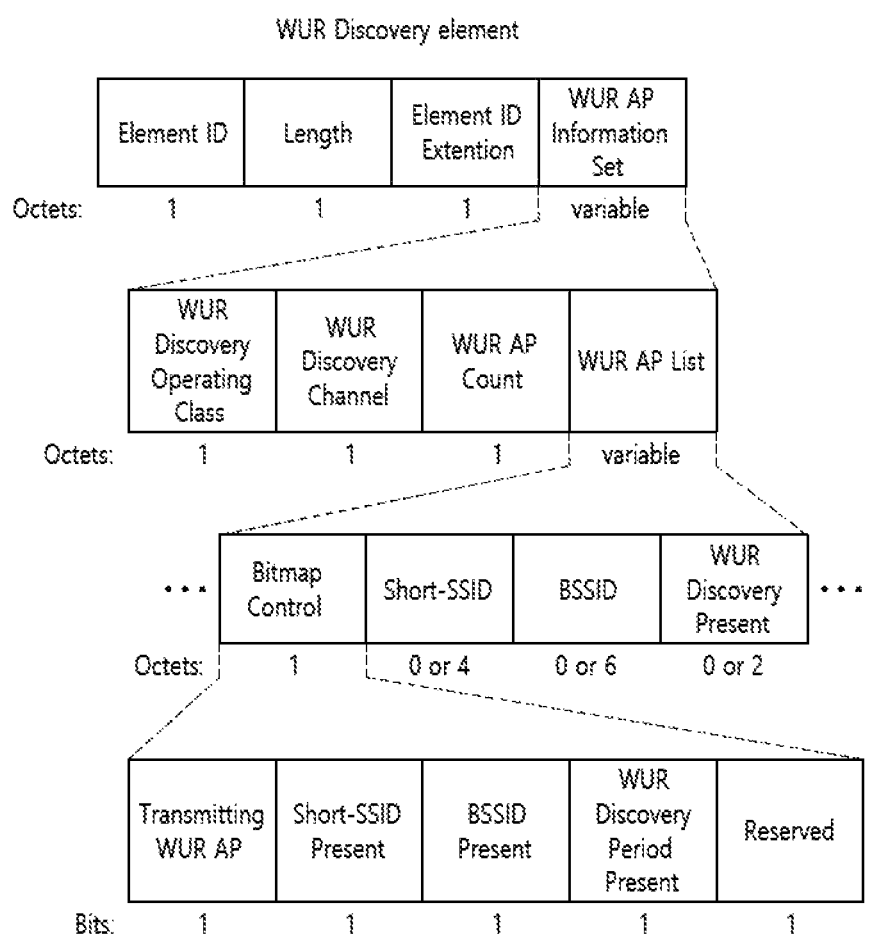
FIG. 32 shows an example of a WUR Discovery element format according to the present embodiment.

FIG. 32 shows an example of a WUR Discovery element format according to the present embodiment.

The format of FIG. 32 may be the same as the WUR Neighbor AP element format of FIG. 20. Additionally, a WUR AP Information Set subfield included in the WUR Discovery element format of FIG. 32 may correspond to the Neighbor AP Information subfield of FIG. 21. A WUR AP List subfield included in the WUR AP Information Set subfield of FIG. 32 may correspond to the Neighbor AP List subfield, which is proposed in FIG. 27. A Bitmap Control subfield of FIG. 32 may correspond to a control subfield, which controls the AP parameter. Herein, the Bitmap Control subfield may include a Transmitting WUR AP subfield, a subfield indicating the presence or absence of a Short-SSID, a subfield indicating the presence or absence of a BSSID, and a subfield indicating the presence or absence of a WUR Discovery Period. The Transmitting WUR AP subfield may identify a WUR discovery channel of a WUR AP.

Figure 33:
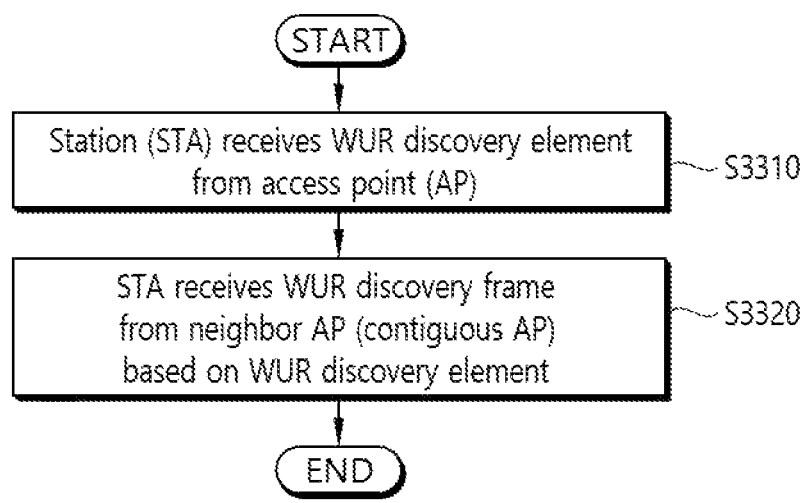
FIG. 33 is a flow chart of a procedure for receiving a WUR Discovery frame according to the present embodiment.

FIG. 33 is a flow chart of a procedure for receiving a WUR Discovery frame according to the present embodiment.

An example of FIG. 33 is performed by an STA, and the STA may correspond to a WUR STA. The present embodiment may reduce the WUR discovery process to a simple process by first receiving information on an AP existing near the STA from a Primary Connectivity Radio (PCR) before performing the WUR discovery process of the STA. Thus, the STA may reduce the power and time being consumed during the scanning of a discovery channel.

In step S3310, a station (STA) receives a WUR discovery element from an access point (AP).

In step S3320, the STA receives the WUR discovery frame from a neighbor AP based on the WUR discovery element.

The WUR discovery element includes AP list information. The AP list information includes information on a WUR discovery period. The WUR discovery frame is received during the WUR discovery period.

More specifically, the AP may notify, to the STA, not only information on the AP itself and discovery information but also information on a neighbor AP and discovery information through the WUR discovery element. The STA may receive the WUR discovery frame during a WUR discovery period that is indicated by the AP list information (or the STA may perform a scanning procedure during a WUR discovery period that is indicated by the AP list information).

The WUR discovery element may include WUR AP information. The WUR AP information may include information on a WUR discovery operating class, information on a WUR discovery channel, and information on a number of WUR APs.

The STA may scan a WUR discovery channel during the WUR discovery period.

The WUR discovery channel may be detected based on information on the WUR discovery channel.

The WUR discovery frame may be received through the WUR discovery channel.

The STA may detect an operating class that is used for a transmission of the WUR discovery frame based on the information on the WUR discovery operating class.

The AP list information may include a parameter of the neighbor AP. The parameter of the neighbor AP may include an identifier of the neighbor AP and information on the WUR discovery period.

The parameter of the neighbor AP may further include parameter control information. The parameter control information may include first information on the presence or absence of an identifier of the neighbor AP and second information on the presence or absence of the WUR discovery period.

The information on the WUR discovery period may include a number of time units (TUs) between consecutive WUR discovery frames.

The STA may perform a first association process with the AP before receiving the WUR discovery element. The STA may perform a second association process with the neighbor AP after receiving the WUR discovery frame. The first and second association processes may be performed in the Primary Connectivity Radio (PCR).

The WUR discovery element may be delivered through a PCR beacon frame or a PCR probe response frame. At this point, the STA may obtain information on a WUR discovery period of a neighbor AP through the PCR beacon frame or PCR probe response frame from the AP, and the STA may perform a WUR discovery process based on the received information.

According to the present embodiment, by notifying not only channel information of an adjacent WUR AP through a WUR discovery element but also a WUR discovery period to a WUR STA, the AP may notify information on how long the WUR STA is required to perform scanning in a WUR discovery channel of each AP. Thus, the power and time being consumed during the discovery process may be further reduced.

Figure 34:
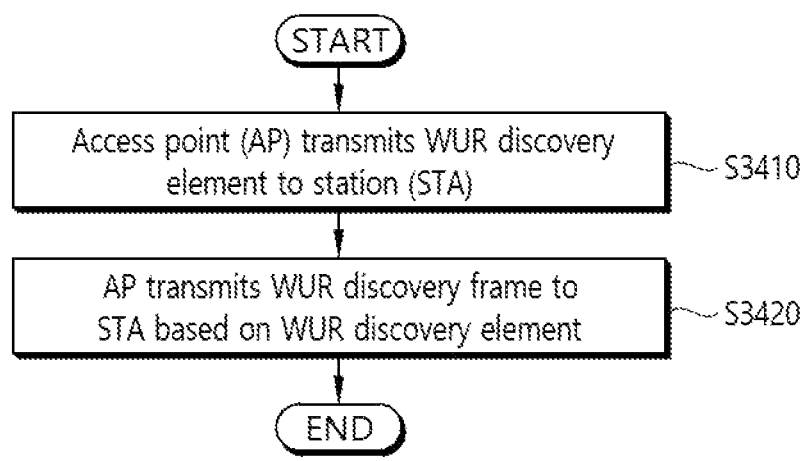
FIG. 34 is a flow chart of a procedure for transmitting a WUR Discovery frame according to the present embodiment.

FIG. 34 is a flow chart of a procedure for transmitting a WUR Discovery frame according to the present embodiment.

An example of FIG. 34 is performed by an AP, and the AP may correspond to a WUR AP. The present embodiment may reduce the WUR discovery process to a simple process by first transmitting information on an AP existing near the STA from a Primary Connectivity Radio (PCR) before performing the WUR discovery process of the STA. Thus, the STA may reduce the power and time being consumed during the scanning of a discovery channel.

In step S3410, an access point (AP) transmits a WUR discovery element to a station (STA).

In step S3420, the AP transmits the WUR discovery frame to the STA based on the WUR discovery element.

The WUR discovery element includes AP list information. The AP list information includes information on a WUR discovery period. The WUR discovery frame is received during the WUR discovery period.

More specifically, the AP may notify, to the STA, not only information on the AP itself and discovery information but also information on a neighbor AP and discovery information through the WUR discovery element. The STA may receive the WUR discovery frame during a WUR discovery period that is indicated by the AP list information (or the STA may perform a scanning procedure during a WUR discovery period that is indicated by the AP list information).

The WUR discovery element may include WUR AP information. The WUR AP information may include information on a WUR discovery operating class, information on a WUR discovery channel, and information on a number of WUR APs.

The STA may scan a WUR discovery channel during the WUR discovery period.

The WUR discovery channel may be detected based on information on the WUR discovery channel.

The WUR discovery frame may be received through the WUR discovery channel.

The STA may detect an operating class that is used for a transmission of the WUR discovery frame based on the information on the WUR discovery operating class.

The AP list information may include a parameter of the neighbor AP. The parameter of the neighbor AP may include an identifier of the neighbor AP and information on the WUR discovery period.

The parameter of the neighbor AP may further include parameter control information. The parameter control information may include first information on the presence or absence of an identifier of the neighbor AP and second information on the presence or absence of the WUR discovery period.

The information on the WUR discovery period may include a number of time units (TUs) between consecutive WUR discovery frames.

The STA may perform a first association process with the AP before receiving the WUR discovery element. The STA may perform a second association process with the neighbor AP after receiving the WUR discovery frame. The first and second association processes may be performed in the Primary Connectivity Radio (PCR).

The WUR discovery element may be delivered through a PCR beacon frame or a PCR probe response frame. At this point, the STA may obtain information on a WUR discovery period of a neighbor AP through the PCR beacon frame or PCR probe response frame from the AP, and the STA may perform a WUR discovery process based on the received information.

According to the present embodiment, by notifying not only channel information of an adjacent WUR AP through a WUR discovery element but also a WUR discovery period to a WUR STA, the AP may notify information on how long the WUR STA is required to perform scanning in a WUR discovery channel of each AP. Thus, the power and time being consumed during the discovery process may be further reduced. However, the present embodiment describes operations performed by the AP of delivering its channel information and WUR discovery period in order to simplify its discovery process.

2. Device Configuration

Figure 35:
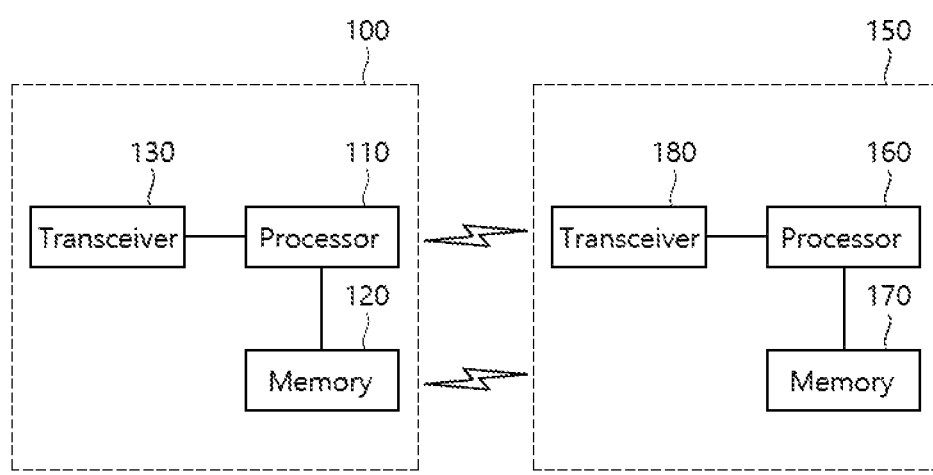
FIG. 35 is a diagram showing a device for implementing the above-described method.

FIG. 35 is a diagram illustrating a device for implementing the foregoing method.

A wireless device (100) of FIG. 35 is a transmitting device that can implement the above-described embodiment and may be operated as an AP STA. The wireless device (100) of FIG. 35 is a receiving device that can implement the above-described embodiment and may be operated as a non-AP STA.

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor (110, 160) may implement the functions, processes, and/or methods proposed in the present disclosure. For example, the processor (110, 160) may perform operations according to the foregoing embodiments.

The operations of the processor (110) of the transmitting device are as described below. The processor (110) of the transmitting device transmits a WUR discovery element and transmits a WUR discovery frame to a receiving device based on the WUR discovery element.

The operations of the processor (160) of the receiving device are as described below. The receiving device may be one of multiple low-power wake-up receivers. The processor (160) of the receiving device receives a WUR discovery element and receives a WUR discovery frame based on the WUR discovery element.

Figure 36:
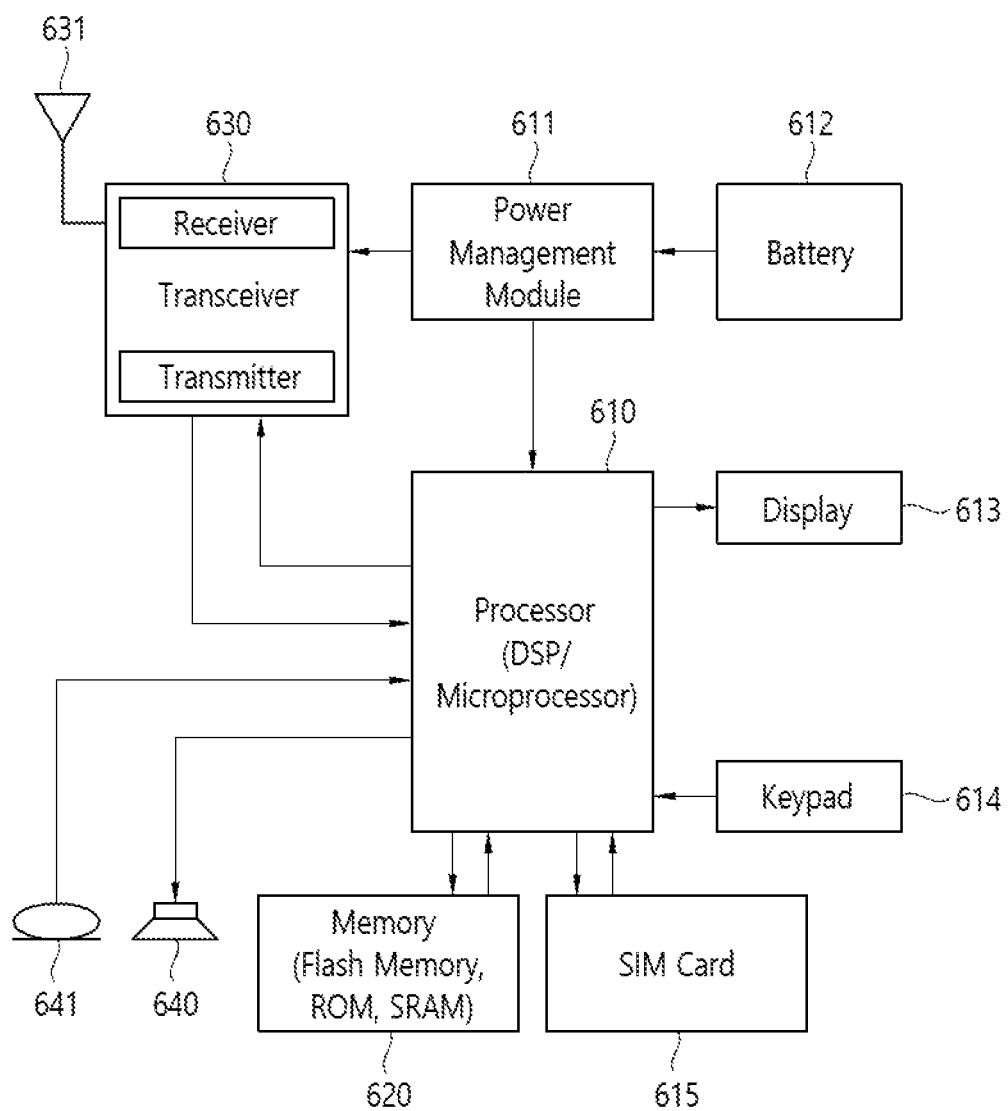
FIG. 36 shows a more detailed wireless device implementing an exemplary embodiment of the present specification.

FIG. 36 shows more detailed wireless device to implement an embodiment of the present specification. The present specification described above for the transmitting device or the receiving device may be applied to this embodiment.

A wireless device includes a processor (610), a power management module (611), a battery (612), a display (613), a keypad (614), a subscriber identification module (SIM) card (615), a memory (620), a transceiver (630), one or more antennas (631), a speaker (640), and a microphone (641).

The processor (610) may be configured to implement proposed functions, procedures and/or methods described in this description. Layers of the radio interface protocol may be implemented in the processor (610). The processor (610) may include ASIC, other chipset, logic circuit and/or data processing device. The processor (610) may be an application processor (AP). The processor (610) may include at least one of a digital signal processor (DSP), a central processing unit (CPU), a graphics processing unit (GPU), a modem (modulator and demodulator). An example of the processor (610) may be found in SNAPDRAGON' series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module (611) manages power for the processor (610) and/or the transceiver (630). The battery (612) supplies power to the power management module (611). The display (613) outputs results processed by the processor (610). The keypad (614) receives inputs to be used by the processor (610). The keypad (614) may be shown on the display (613). The SIM card (615) is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory (620) is operatively coupled with the processor (610) and stores a variety of information to operate the processor (610). The memory (620) may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory (620) and executed by the processor (610). The memory (620) can be implemented within the processor (610) or external to the processor (610) in which case those can be communicatively coupled to the processor (610) via various means as is known in the art.

The transceiver (630) is operatively coupled with the processor (610), and transmits and/or receives a radio signal. The transceiver (630) includes a transmitter and a receiver. The transceiver (630) may include baseband circuitry to process radio frequency signals. The transceiver (630) controls the one or more antennas (631) to transmit and/or receive a radio signal.

The speaker (640) outputs sound-related results processed by the processor (610). The microphone (641) receives sound-related inputs to be used by the processor (610).

In case of the transmitting device, the processor (610) transmits a WUR discovery element and transmits a WUR discovery frame to the receiving device based on the WUR discovery element.

In case of the receiving device, the processor (610) receives a WUR discovery element and receives a WUR discovery frame based on the WUR discovery element.

The WUR discovery element includes AP list information. The AP list information includes information on a WUR discovery period. The WUR discovery frame is received during the WUR discovery period.

More specifically, the AP may notify, to the STA, not only information on the AP itself and discovery information but also information on a neighbor AP and discovery information through the WUR discovery element. The STA may receive the WUR discovery frame during a WUR discovery period that is indicated by the AP list information (or the STA may perform a scanning procedure during a WUR discovery period that is indicated by the AP list information).

The WUR discovery element may include WUR AP information. The WUR AP information may include information on a WUR discovery operating class, information on a WUR discovery channel, and information on a number of WUR APs.

The STA may scan a WUR discovery channel during the WUR discovery period.

The WUR discovery channel may be detected based on information on the WUR discovery channel.

The WUR discovery frame may be received through the WUR discovery channel.

The STA may detect an operating class that is used for a transmission of the WUR discovery frame based on the information on the WUR discovery operating class.

The AP list information may include a parameter of the neighbor AP. The parameter of the neighbor AP may include an identifier of the neighbor AP and information on the WUR discovery period.

The parameter of the neighbor AP may further include parameter control information. The parameter control information may include first information on the presence or absence of an identifier of the neighbor AP and second information on the presence or absence of the WUR discovery period.

The information on the WUR discovery period may include a number of time units (TUs) between consecutive WUR discovery frames.

The STA may perform a first association process with the AP before receiving the WUR discovery element. The STA may perform a second association process with the neighbor AP after receiving the WUR discovery frame. The first and second association processes may be performed in the Primary Connectivity Radio (PCR).

The WUR discovery element may be delivered through a PCR beacon frame or a PCR probe response frame. At this point, the STA may obtain information on a WUR discovery period of a neighbor AP through the PCR beacon frame or PCR probe response frame from the AP, and the STA may perform a WUR discovery process based on the received information.

According to the present embodiment, by notifying not only channel information of an adjacent WUR AP through a WUR discovery element but also a WUR discovery period to a WUR STA, the AP may notify information on how long the WUR STA is required to perform scanning in a WUR discovery channel of each AP. Thus, the power and time being consumed during the discovery process may be further reduced.

What is claimed is:

1. A method for receiving a Wake-Up Receiver (WUR) discovery frame in a wireless local area network (LAN) system, the method comprising:
   receiving, by a station (STA), a WUR discovery element from an access point (AP); and
   receiving, by the STA, the WUR discovery frame from a neighbor AP based on the WUR discovery element,
   wherein the WUR discovery element includes AP list information,
   wherein the AP list information includes a parameter of the neighbor AP, and the parameter of the neighbor AP includes an identifier of the neighbor AP and information on a WUR discovery period,
   wherein the parameter of the neighbor AP further includes parameter control information, and the parameter control information includes first information on the presence or absence of an identifier of the neighbor AP and second information on the presence or absence of the WUR discovery period, and
   wherein the WUR discovery frame is received during the WUR discovery period.

2. The method of claim 1, wherein the WUR discovery element includes WUR AP information, and
   wherein the WUR AP information includes information on a WUR discovery operating class, information on a WUR discovery channel, and information on a number of WUR APs.

3. The method of claim 2, further comprising:
   scanning, by the STA, a WUR discovery channel during the WUR discovery period,
   wherein the WUR discovery channel is detected based on information on the WUR discovery channel, and
   wherein the WUR discovery frame is received through the WUR discovery channel.

4. The method of claim 2, further comprising:
   detecting, by the STA, an operating class being used for a transmission of the WUR discovery frame based on the information on the WUR discovery operating class.

5. A station (STA) for receiving a Wake-Up Receiver (WUR) discovery frame in a wireless local area network (LAN) system, the STA comprising:
   a memory;
   a transceiver; and
   a processor being operatively coupled with the memory and the transceiver,
   wherein the processor is configured:
   to receive a WUR discovery element from an access point (AP), and
   to receive the WUR discovery frame from a neighbor AP based on the WUR discovery element,
   wherein the WUR discovery element includes AP list information,
   wherein the AP list information includes parameter of the neighbor AP, and the parameter of the neighbor AP includes an identifier of the neighbor AP and information on a WUR discovery period,
   wherein the parameter of the neighbor AP further includes parameter control information, and the parameter control information includes first information on the presence or absence of an identifier of the neighbor AP and second information on the presence or absence of the WUR discovery period, and
   wherein the WUR discovery frame is received during the WUR discovery period.

6. The STA of claim 5, wherein the WUR discovery element includes WUR AP information, and
   wherein the WUR AP information includes information on a WUR discovery operating class, information on a WUR discovery channel, and information on a number of WUR APs.

7. The STA of claim 6, wherein the processor scans a WUR discovery channel during the WUR discovery period, wherein the WUR discovery channel is detected based on information on the WUR discovery channel, and wherein the WUR discovery frame is received through the WUR discovery channel.

8. The STA of claim 6, wherein the processor detects an operating class being used for a transmission of the WUR discovery frame based on the information on the WUR discovery operating class.

9. A method for transmitting a Wake-Up Receiver (WUR) discovery frame in a wireless local area network (LAN) system, the method comprising:

transmitting, by an access point (AP), a WUR discovery element to a station (STA); and transmitting, by the AP, the WUR discovery frame to the STA based on the WUR discovery element, wherein the WUR discovery element includes AP list information, wherein the AP list information includes a parameter of the AP, and the parameter of the AP includes an identifier of the AP and information on a WUR discovery period, wherein the parameter of the AP further includes parameter control information, and the parameter control information includes first information on the presence or absence of an identifier of the AP and second information on the presence or absence of the WUR discovery period, and wherein the WUR discovery frame is received during the WUR discovery period.

\* \* \* \* \*